US007570888B2

(12) United States Patent
Pappert et al.

(10) Patent No.: US 7,570,888 B2
(45) Date of Patent: Aug. 4, 2009

(54) HIGH POWER, OPTICALLY-LINEARIZED MICROWAVE FIBER OPTIC LINK WITH SUPPRESSION OF FIBER INDUCED DISTORTION

(75) Inventors: Stephen A Pappert, San Diego, CA (US); Chen-Kuo Sun, Escondido, CA (US); Richard J Orazi, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/277,523

(22) Filed: Nov. 25, 2008

(65) Prior Publication Data

US 2009/0074419 A1 Mar. 19, 2009

Related U.S. Application Data

(63) Continuation of application No. 10/316,291, filed on Dec. 10, 2002, now abandoned.

(60) Provisional application No. 60/341,915, filed on Dec. 18, 2001.

(51) Int. Cl.
*H04B 10/00* (2006.01)
*H04B 10/04* (2006.01)

(52) U.S. Cl. ...................................... 398/159; 398/194

(58) Field of Classification Search ......... 398/158-159, 398/192-195

See application file for complete search history.

(56) References Cited

U.S. PATENT DOCUMENTS

| | | | |
|---|---|---|---|
| 4,992,754 A | 2/1991 | Blauvelt et al. | |
| 5,126,871 A | 6/1992 | Jeffers | |
| 5,257,124 A | 10/1993 | Glaab et al. | |
| 6,246,965 B1 * | 6/2001 | Cockerham et al. | 702/85 |
| 6,538,789 B2 | 3/2003 | Sun | |
| 2003/0011839 A1 * | 1/2003 | Liang et al. | 359/124 |

FOREIGN PATENT DOCUMENTS

JP 62-171351 * 7/1987

OTHER PUBLICATIONS

Wei Huang, et al.; Novel Third-Order Distortion Generator with Residual IM2 Suppression Capabilities; Dec. 1998; IEEE Transaction on Microwave Theory and Techniques, vol. 46, No. 12, pp. 2372-2382.

Jun Ohya, et al.; Second-Order Distortion Generated by Amplification of Intensity-Modulated Signals with Chirping in Erbium-Doped Fiber; Sep. 1992; IEEE Photonics Technology Letters, vol. 4, No. 9, pp. 1000-1002.

Jun Ohya, et al.; Cancellation of Second-Order Distortion of Directly Modulated Laser in Erbium-Doped Fiber Amplifier; Apr. 1993; IEEE Photonics Technology Letters, vol. 4, No. 4, pp. 414-416.

* cited by examiner

*Primary Examiner*—Quan-Zhen Wang
(74) *Attorney, Agent, or Firm*—Tarolli, Sundheim, Covell & Tummino LLP

(57) ABSTRACT

Techniques and system implementations for fiber optic transmission systems for suppressing fiber induced distortions and modulation-induced distortions as well as increasing the link power and RF gain.

27 Claims, 17 Drawing Sheets

HIGH POWER, OPTICALLY-LINEARIZED MICROWAVE FIBER OPTIC LINK WITH SUPPRESSION OF FIBER INDUCED DISTORTION

This application is a continuation of U.S. application Ser. No. 10/316,291, filed Dec. 10, 2002, which claims the benefit of U.S. Provisional Application No. 60/341,915 filed on Dec. 18, 2001. The entireties of the disclosures of those application are incorporated herein by reference.

BACKGROUND

The present application relates generally to electro-optic transmitter and receiver devices and their applications in connection with fiber optic transmission links.

Multi-octave bandwidth fiber optic transmission links using current-modulated laser diodes in optical transmitters may be limited in their dynamic range due to signal distortions. Such signal distortions may include the second-order and third-order distortion products generated in response to the frequency components of the modulation signal that drives the laser diode. In some systems, the second-order and third-order distortions may limit multi-octave bandwidth performance, and the third-order distortion may also limit the sub-octave bandwidth performance.

Most commercial laser diodes typically have limited optical power as well as transfer curves that cause both second-order and third-order distortions. In addition, nonlinear distortions related to fiber dispersion effects can further limit the linearity of a fiber optic transmission system. For example, the second-order distortion induced by the fiber dispersion can be particularly pronounced in long distance fiber links. See, e.g., C. Y. Kuo, "Fundamental Second-Order Nonlinear Distortions in Analog AM CATV Transport Systems Based on Single Frequency Semiconductor Lasers," Journal of Lightwave Technology, Vol. 10, page 235 (1992). Suppression of such distortions can be technically complex in part because the fiber induced second-order distortion levels are dependent on the RF frequency.

In various applications using fiber optic transmission links, the fundamental laser diode distortions and the fiber related second-order distortions may constitute the primary sources for the adverse nonlinear distortions. Thus, it is desirable to provide techniques for suppressing such distortions in a variety of applications such as in developing high linearity analog AM fiber links. It is also desirable to provide a high dynamic range to meet the continuing needs for a higher power and more linear arrangement in laser diode intensity modulated links used for multi-octave bandwidth applications.

SUMMARY

This application includes techniques for mitigating signal distortions caused by the modulation operations in optical transmitters and by the fiber dispersion in a fiber optic transmission system. One implementation of such techniques may include the following operations.

A modulation signal is generated to carry information to be transmitted. A complementary modulation signal is produced to have a phase shifted from the modulation signal by 180 degrees. A first optical transmitter is modulated with the modulation signal to produce a first optical signal and a second optical transmitter is modulated with the complementary modulation signal to produce a second optical signal. Next, the first and said second optical signals are then transmitted over a single fiber link or separate fiber links to a receiver which may be at a remote location.

Subsequently at the receiver, the first and said second optical signals are converted into two electrical signals. The two electrical signals are combined to effectuate a subtraction to negate distortions caused by fiber dispersion for different frequency components in said first and said second optical signals. The resultant electrical output includes information in said input modulation signal that is substantially free of the distortions caused by the optical dispersion in the fiber link.

Prior to transmission over the fiber link, the first and said second optical signals may be optically modified by using optical linearizers to reduce signal distortions. Such distortions may be caused by, e.g., modulations of the optical transmitters.

In addition to the above operations, the modulation signal and the complementary modulation signal may be electronically modified to carry compensating distortions that negate subsequent distortions including distortions caused by laser modulation. The electronic compensating distortions may also be used to negate the fiber-dispersion induced signal distortions.

The above techniques have various advantages. For example, either one or both of the second-order and the third-order intermodulation products may be essentially eliminated, by, e.g., using the in-line optical linearizers. This effect is desirable in achieving a wideband linearity. Another advantage is that the fiber dispersion induced second-order distortion, which is RF frequency dependent, is substantially suppressed by using the push-pull fiber link configuration through the generation of two optical signals for transmission based on the modulation signal and its complementary counterpart. As yet another example, the link optical power based on the present techniques can be effectively doubled to achieve a gain of 6 dB in the RF link over that of a single transmitter system. This gain in the transmission power leads to an increased transmission range.

These and other features and advantages of the present application will be described in details with reference to the following figures, the detailed description, and the claims.

DETAILED DESCRIPTION

This application includes transmission techniques and configurations of fiber optic transmission systems for simultaneously achieving high transmitted optical power and high linearity. Both laser diode and fiber-induced distortion effects may be suppressed.

One implementation of a fiber optic transmission link described in this application includes a signal coupler for coupling to a modulating signal to generate complementary (inverted and non-inverted) electrical outputs representative of the modulating signal. Two electro-optic transmitters are connected to the complementary outputs of the signal coupler respectively for modulating optical energy in response to the modulation signal. The output of each transmitter is passed through independent optical linearizers to substantially reduce either or both of the second-order and third-order nonlinearities introduced by the optical transmitter. The modulated optical energy is transmitted through either a single optical fiber or separate optical fibers coupled to optical detectors for transforming the optical energy into electrical replicas of the complementary electrical outputs representative of the modulation signal. The optical detectors are coupled to a combiner for subtracting the replicas to generate an output signal representative of the modulation signal wherein the detected optical power has been increased and the RF frequency dependent second-order distortion induced by the interaction of laser chirp with fiber dispersion is substantially suppressed.

Figure 1:
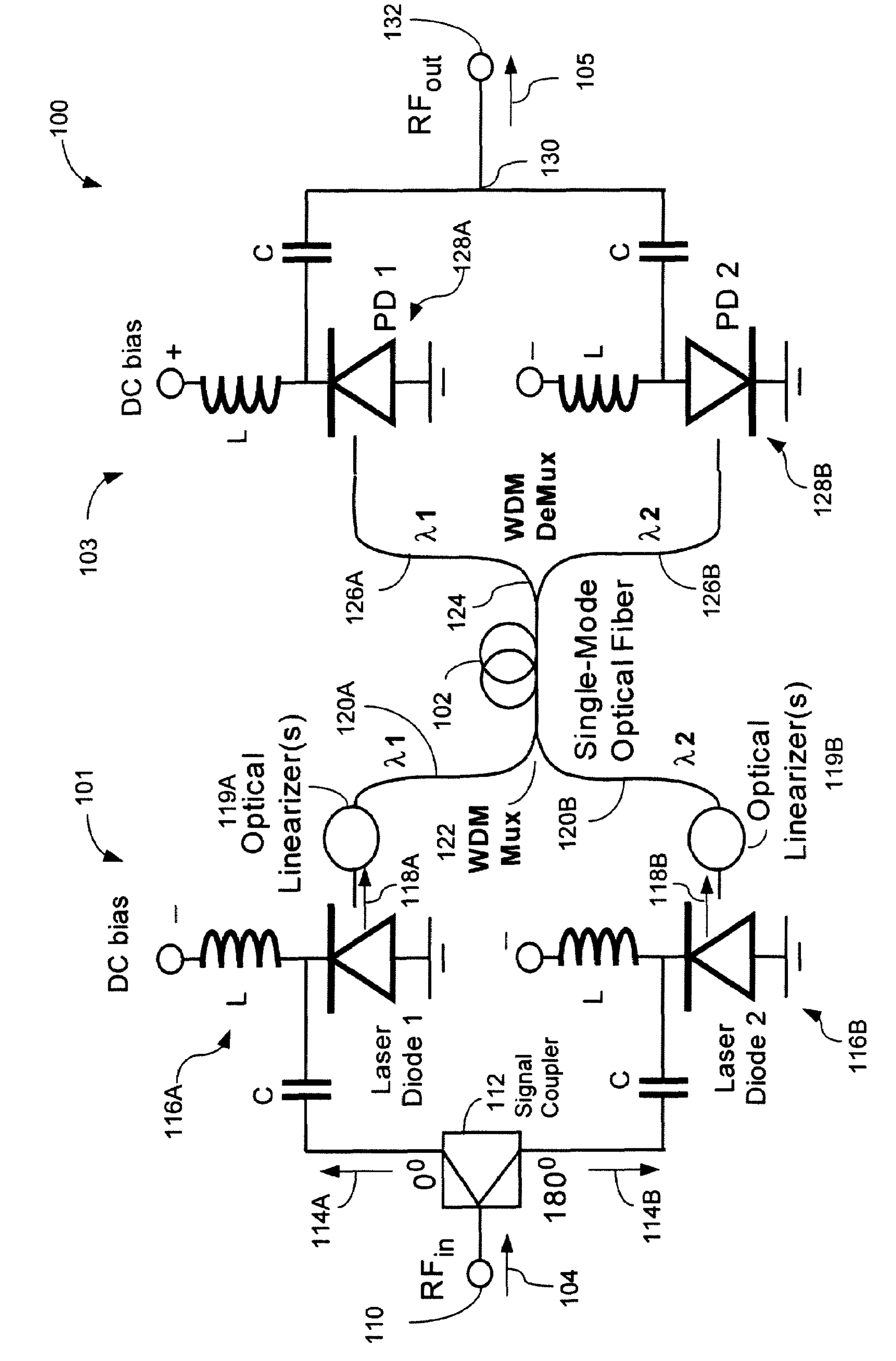
FIG. 1 illustrates one exemplary implementation of a wavelength division multiplexed fiber optic transmission system.

FIG. 1 is a diagram of a fiber optic transmission system 100 according to one implementation. The system 100 includes a transmitter module 101, a single fiber link 102, and a receiver module 103 which may be at a remote location. The transmitter module 101 has an electrical input terminal or port 110 to receive a modulated input electrical signal 104, which may be in the RF spectrum in various applications and may also be in other spectra as well. The electrical signal 104 may be generated from a modulation signal source and carries information to be transmitted in the optical domain to the receiver module 103 via the fiber link 102. The receiver module 103 includes an electrical output terminal or port 132 to export an electrical output signal 105 which substantially carries the same information as in the input signal 104 with minimized signal distortions. The following sections describe components of the modules 101 and 103 and their operations in minimizing the signal distortions.

The transmitter module 101 includes a signal coupler 112 to process the input signal 104 and to produce two complementary copies of the input signal 104: electrical signals 114A and 114B at two output ports. The signals 114A and 114B each carry the same information as the input signal 104 but the relative phase of the signals 114A and 114B is made to have a delay of 180 degrees over the frequency range of interest, so that one is an inverted signal of the other. The signal coupler 112 may be implemented in various configurations such as configurations that include a wideband RF differential output amplifier or a wideband hybrid coupler.

Two separate optical transmitters 116A and 116B are respectively coupled to the output ports of the signal coupler 112. Each optical transmitter is responsive to the input electrical signal and is operable to produce an optical signal 118A or 118B which is modulated to carry the information in the electrical signal 114A or 114B. By way of example, the optical transmitters 116A and 116B may be laser diodes, e.g., Fujitsu Model FLD3F7CX, where the electrical driving signal for a laser diode may be modulated to produce a modulated optical signal. Hence, the optical transmitters 116A and 116B convert the signals 114A and 114B into optical signals 118A and 118B, respectively. In general, the optical transmitters 116A and 116B may operate or lase at either the same wavelength or two different wavelengths. In the implementation shown in FIG. 1, the optical transmitters 116A and 116B generates modulated optical energy in response to complementary modulation signals at two different optical carrier wavelengths λ1 and λ2.

The transmitter module 101 as illustrated includes two optical paths 120A and 120B, such as two fibers, to respectively carry the signals 118A and 118B to a wavelength-division-multiplexing (WDM) multiplexer (MUX) 122 as the optical output port of the module 101. The MUX 122 combines the two optical signals 118A and 118B into the same fiber 102 for transmission to the receiver module 103. The fiber used in the fiber link 102 may be a single-mode fiber.

The optical output of each optical transmitter 116A or 116B can have nonlinear distortions caused by the modulation operation. Hence, two optical linearizers 119A and 119B are respectively coupled in the optical paths 120A and 120B to substantially reduce the nonlinear distortions introduced by the laser diodes. As described in later sections of this application, various configurations of an optical linearizer may be used, such as a passive optical component with wavelength-dependent transfer characteristics. Each optical linearizer 119A or 119B may include two or more optical linearizing elements to achieve a desired linearization profile. In this case the optical linearizer interacts with the frequency chirp characteristics of the laser diode to substantially suppress either or both of the second-order and third-order nonlinear distortions. The operating point of the optical linearizer for each laser diode is tailored to match the optical wavelength of each source.

The fiber link 102 is generally dispersive and the corresponding fiber dispersion may cause additional distortions to the signals. This portion of the signal distortions can be significantly reduced or minimized by using a push-pull mechanism implemented in both modules 101 and 102. In the transmitter module 101, the part of the push-pull mechanism is the generation of the two complementary signals and transmission of the complementary signals in the optical domain through the fiber link 102. In the receiver module 102, the part of the push-pull mechanism is a WDM demultiplexer (DeMux) 124, two oppositely biased optical detectors 128A and 128B and an electrical combiner 130.

The DeMux 124 is coupled to the receiving end of the fiber link 102 to separate the received signals at two different optical carrier wavelengths to two separate optical paths 126A and 126B, respectively. The optical detector 128A, e.g., a photodiode (PD), is coupled in the optical path 126A to detect the optical signal at the wavelength λ1. The other optical detector 128B, e.g., another photodiode, is oppositely biased with respect to the detector 128A and is coupled in the optical path 126B to detect the optical signal at the wavelength λ2. Hence, the optical detectors 128*a* and 128B operate to convert the modulated optical energy into complementary electrical replica signals respectively. The output terminals of the two detectors 128A and 128B are combined at the combiner 130.

Notably, the combiner 130 and the two oppositely-biased detectors 128A and 128B operate in combination to subtract the complementary signals to generate an output replica of the modulating signal 104 essentially free of the distortions caused by the fiber dispersion. The signal combiner 130 may be implemented by, for example, a wideband RF differential input amplifier or a wideband hybrid coupler. Exemplary techniques for push-pull fiber links for second-order distortion suppression are described in U.S. Pat. Nos. 5,126,871 and 5,257,124. In this application, a push-pull arrangement in FIG. 1 is employed to effectively double the transmitted power as well as to suppress the fiber dispersion induced second-order distortion. The link linearization of the laser diodes is achieved through the independent use of the optical linearizers 119A and 119B. The link linearization of the RF frequency dependent fiber dispersion induced distortion is achieved through the push-pull link operation that effectively cancels the fiber related second-order nonlinearities. This arrangement simultaneously achieves high power, laser diode distortion suppression, and fiber dispersion related second-order distortion suppression.

Figure 2:
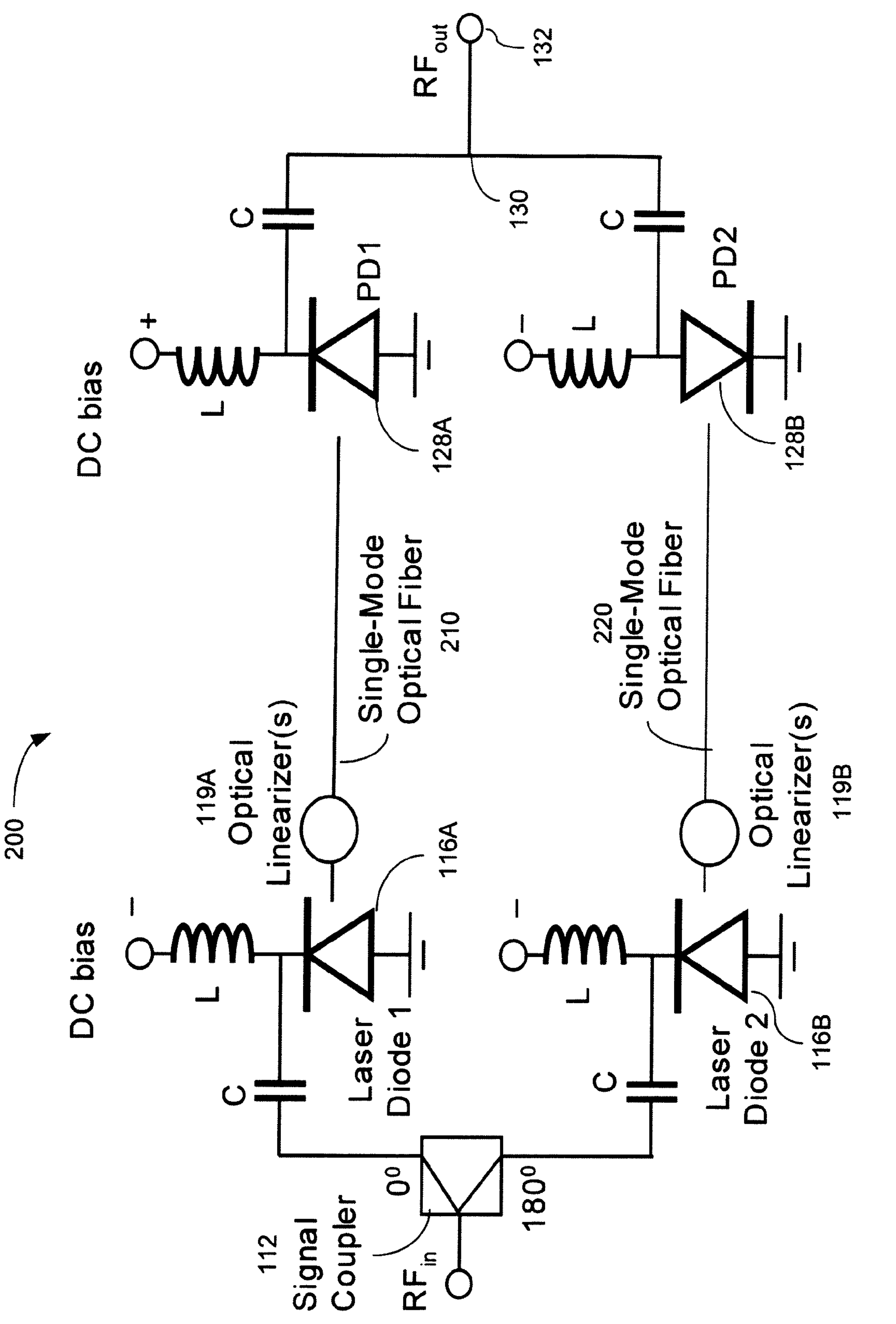
FIG. 2 illustrates another exemplary implementation of a diagram of a fiber optic transmission system that uses two separate optical transmission fibers.

FIG. 2 shows another implementation of a fiber transmission system 200 where two separate fibers 210 and 220 are used to transmit the two optical signals to the detectors 128A and 128B in the receiver module. In this configuration, the two optical transmitters 116A and 116B may lase at two different wavelengths as in FIG. 1. In addition, the optical transmitters 116A and 116B may be configured to generate optical energy at a common wavelength, namely $\lambda 1=\lambda 2$. In this case, the optical linearizers 119A and 119B and their operating points can be identical.

Figure 3:
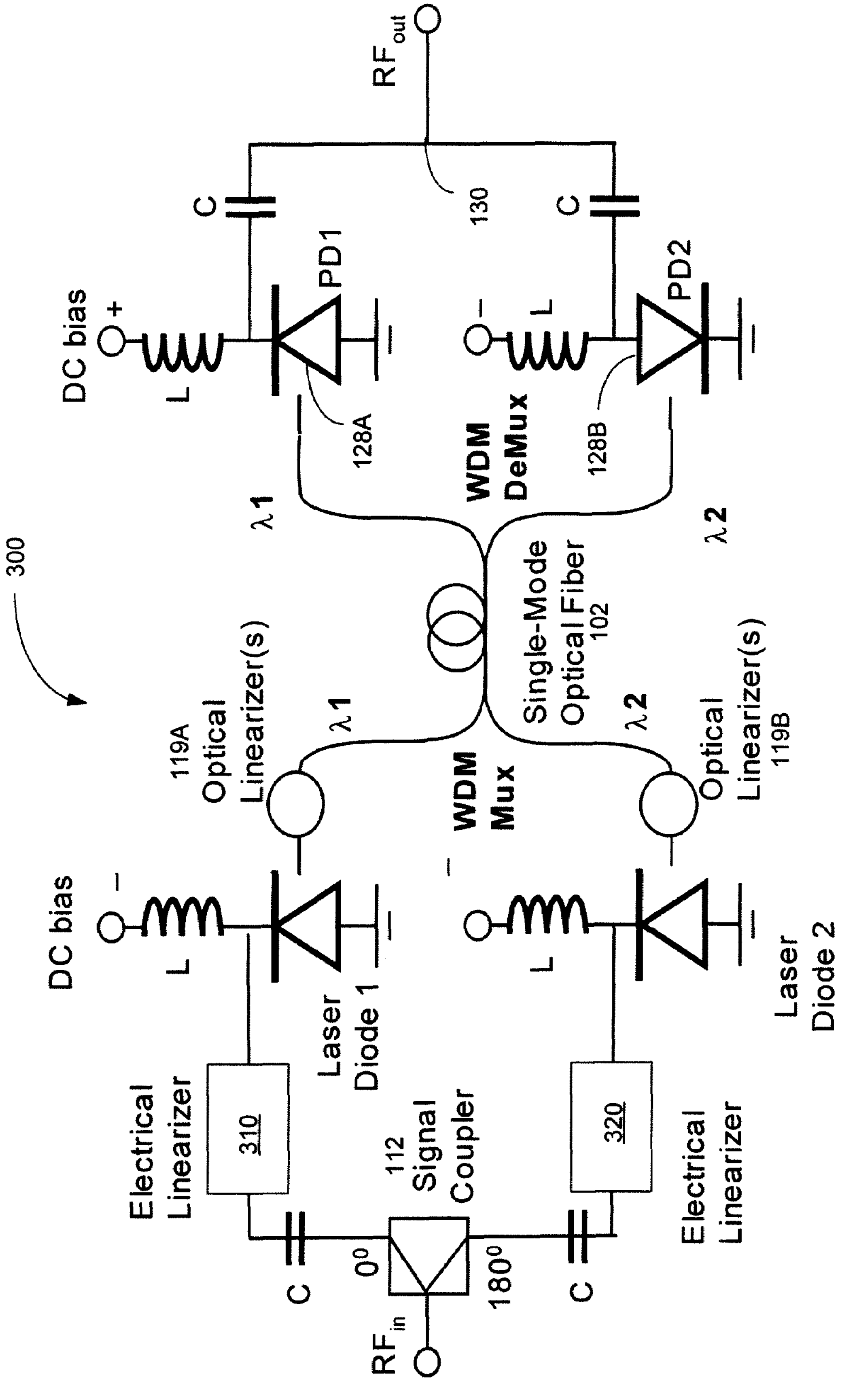
FIG. 3 shows an implementation of electrical linearizers in the wavelength division multiplexed fiber optic transmission system shown in FIG. 1.

FIG. 3 is a diagram of yet another implementation of a fiber optic transmission system 300 that adds two electrical linearizers 310 and 320 to modify the signals 114A and 114B, respectively, prior to driving the transmitters 116A and 116B. The electrical linearizers 310 and 320 are configured to produce electrical pre-distortions in the driving signals for each laser diode RF drive path. Each electrical linearizer or pre-distortion circuit is coupled in an electrical path of the driving signal prior to reception by the optical transmitter to superimpose an electrical pre-distortion signal to the control signal that reduces nonlinear distortions in the output optical signal produced by the optical transmitter. Various pre-distortion circuits may be used for implementing the exemplary embodiments, including the electrical pre-distortion circuits described by Huang and Saad in "Novel Third-Order Distortion Generator with Residual IM2 Suppression Capabilities," IEEE Transactions on Microwave Theory and Techniques, Vol. 46 (12), pp. 2372-2382 (December, 1998). Certainly, the system 200 shown in FIG. 2 may also be modified to include two electrical linearizers 310 and 320.

Hence, with the optical linearizers 119A and 119B, the system 300 uses a hybrid or dual electrical and optical linearization approach for improving the linearization of optically transmitted microwave signals from each optical transmitter. In some applications, the electrical linearization may be used to improve either second- or third-order nonlinear distortion only, while the optical linearization optimized to improve the other distortion component. In another configuration under this approach, both the electrical and optical linearization process may be used to improve both the second- and third-order optical transmitter nonlinearity. Flexibility exists with this approach in allowing both the electrical and optical domain linearization to be tailored and optimized independently and on a case by case basis. This process is valuable in allowing for inferior laser diodes with respect to linearity to be substantially improved. The linearity improvements that can be obtained with this hybrid technique generally exceed the improvements of each of these techniques used separately. One virtue of this hybrid technique is that the optical linearization can be done not only at the transmitter site, but at the optical detector site as well. This allows for the possibility of correcting for some of the fiber induced nonlinearities incurred during the long fiber transmission. In this special case as well as for some other topologies, active control to maintain minimum distortion levels may be implemented.

The optical linearizers 119A and 119B used in the above-described systems may be implemented in various configurations. In general, each optical linearizer is designed to optically generate nonlinear distortion signals (hereinafter sometimes collectively referred to as "compensation distortions") that can compensate for the transmitter distortions. Accordingly, the compensation distortions can be added to the output of the optical transmitter to cancel the transmitter distortions (second- and/or third-order distortions) in the output.

The following sections first describe combinations of optical linearization and electrical linearization that can be used in the push-pull transmission techniques and systems described in this application. Then implementations of optical linearizers are described.

BRIEF DESCRIPTION OF THE DRAWINGS

The following sections describe specific implementations of the above electronic pre-distortion techniques and other hybrid configurations that integrate both optical linearization and electrical pre-distortion or post-distortion techniques. Such hybrid linearization explores and combines advantages of the optical linearization and the electrical pre-distortion and post-distortion techniques to achieve enhanced linearization performance that would otherwise be difficult to achieve with either techniques alone. Notably, the linearization of such hybrid systems can be dynamically controlled to adjust the distortion compensation and to maintain the linearization in the optical signals in presence of various fluctuations and variations in the optical transmitters and the optical transmission paths that change the adverse nonlinear characteristics in time.

In addition to a pre-distortion circuit, one or more optical linearizers may also be placed in the optical path of the output optical signal from the optical transmitter, either at the transmitter side or the receiver side of a system. Such an optical linearizer is an external optical component that possesses wavelength dependent transfer characteristics. By matching the optical transmitter wavelength properties with the correct external component operating point, significant reduction or cancellation of the nonlinear microwave signal distortion may be achieved. When operated alone, a properly-designed optical linearizer may substantially reduce both second- and third-order nonlinearities in the output signal generated by the laser diode transmitter.

In general, various optical devices may be used to form an optical linearizer. Examples include optical linearizers and the associated fiber systems disclosed by C. K. Sun in "Optical Linearizer for Fiber Communications," U.S. patent application Ser. No. 09/825,631, filed Apr. 3, 2001. Various examples of optical linearizers will also be described at later sections of this application.

Figure 4:
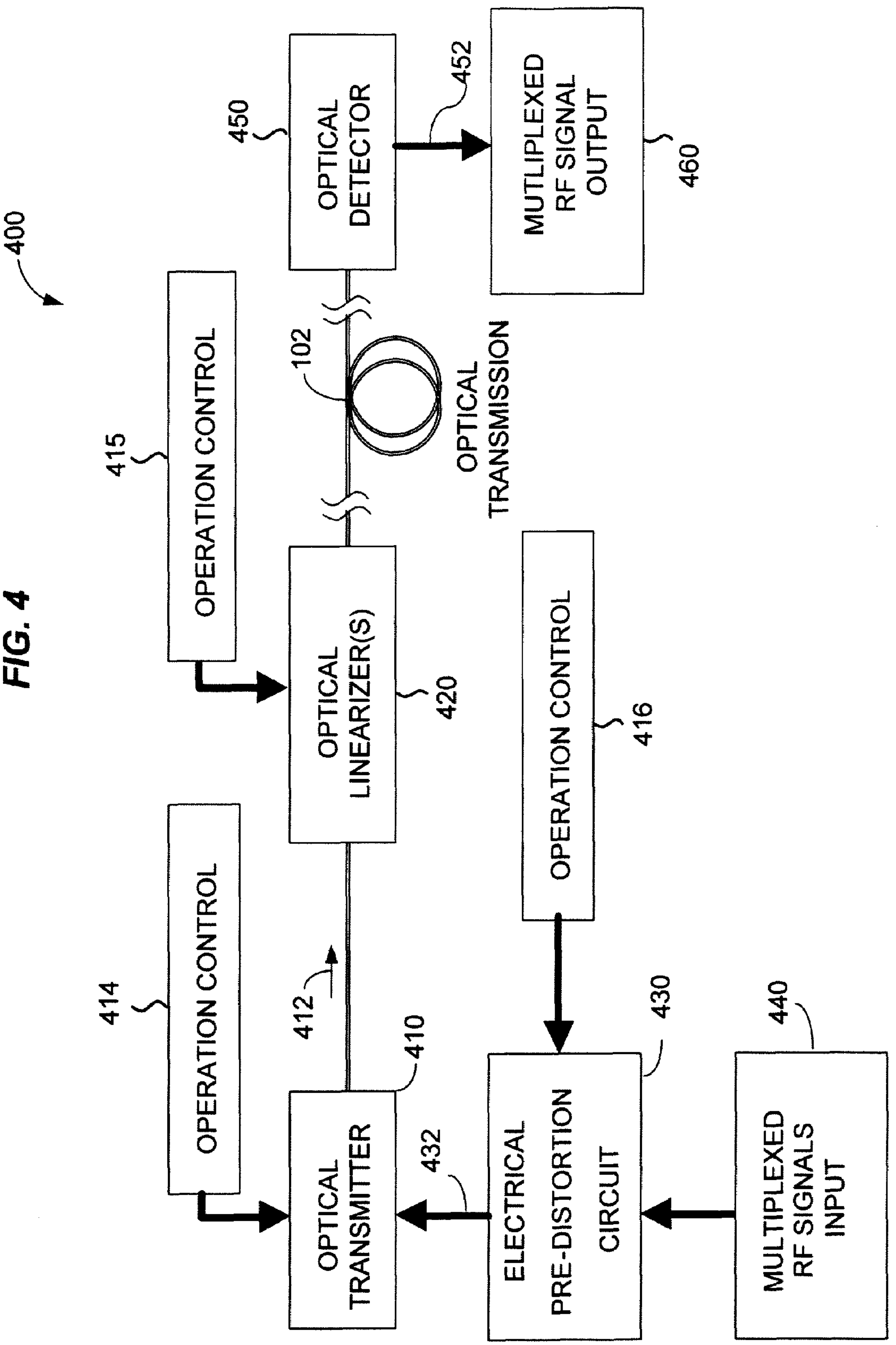
FIG. 4 shows one implementation of an optical communication system to illustrate basic features of a hybrid electrical and optical linearization mechanism that can be used in the system shown in FIG. 3.

FIG. 4 illustrates an optical communication system 400 of the hybrid electrical and optical linearization approach according to one embodiment. The optical transmitter 410, such as a current-modulated laser diode, is used to generate a laser beam 412 for optical transmission through an optical link, such as a fiber link or network. The laser beam 412 may be modulated in a particular manner to carry information. Multiplexed RF signals 440 are input to the optical transmitter 410 to modulate the laser beam 412, e.g., by modulating the driving current in the optical transmitter 410. This direct modulation of the optical transmitter 410 may cause adverse nonlinear distortions in the information-carrying signal embedded in the laser beam 412. The system 400 includes an electrical pre-distortion circuit 430 to modify the RF signals 440 by introducing specific amounts of nonlinear distortions to the signals 440 to produce a composite signal 432 for modulating the optical transmitter 410. The introduced nonlinear distortions may include, for example, either or both of the second-order and third-order signal distortions to negate or substantially reduce the nonlinear distortions in the laser beam 412 generated by the optical transmitter 410. The optical domain laser output signal 412 has improved distortion characteristics by virtue of this electronic pre-distortion alone.

Notably, the system 400 also incorporates an optical linearizer 420 in the optical path of the laser beam 412 to optically add desired distortions on the laser beam 412 to negate the remaining distortions that are not compensated for by the electrical pre-distortion circuit 430. The laser signal 412 is directed to pass through the external optical linearizer 420 to achieve this optical compensation for signal distortions. The optical linearizer 420 may be implemented in various configurations, such as a fused fiber coupler with wavelength dependent transfer characteristics and other exemplary implementations described in this application. By selecting the operating point of the wavelength dependent optical component transfer curve of the optical linearizer 420, further cancellation of the laser nonlinear distortion can be achieved. More than one optical linearization component may be cascaded as part of the optical linearizer 420. Such linearization components may be configured to have different optical transfer curves so that the combined effects of such components in the linearizer 420 produce desired linearization properties in the laser signal 412 after such optical processing.

As illustrated in FIG. 4, the laser signal 412 output by the optical linearizer 420 may be directed through an optical transmission link 102 such as a distance of optical fiber. An optical detector 450 may be optically coupled to receive a portion of or the entirety of the transmitted laser signal 412. The electrical output 452 of the optical detector includes a replica of the multiplexed RF input signals 440 whose distortion is significantly reduced by the operation of the circuit 430 and the optical linearizer 420. The optimum operating conditions of the optical transmitter 410, electrical pre-distortion circuit 430 and the optical linearizer 420 may in general be regulated by separate operation controllers 414, 416 and 415, respectively. In practice, such operation controls may be implemented in a more integrated and unified fashion, where two or all three controllers may be combined into a single control unit.

Both open and closed loop linearizer operations can be used to minimize the signal distortions. In the open loop linearizer operation, a dynamic feedback loop is not used and each of the pre-distortion circuit 430 and the optical linearizer 420 may be adjusted to optimize the net linearization effect. For example, the laser diode and optical linearizer set points in terms of temperature (wavelength) and laser bias current (optical power), and the electronic pre-distortion circuit parameters are initially adjusted and fixed to minimize distortion. In the close loop linearizer operation, a signal detector, such as the detector 450, and a dynamic feedback loop that responds to the output of the detector, may be used to control either or both of the pre-distortion circuit 430 and the optical linearizer 420 in real time.

The sequence of optimizing the electronic pre-distortion and optical linearization processes can be important in certain applications. In general, either the electrical or the optical linearization may be carried out first. When the electrical linearization is performed first with a composite microwave signal modulating the drive current to a laser diode in the optical transmitter 410, the electrical pre-distortion circuit 430 may be tuned to reduce either or both of the second- and third-order nonlinearities introduced by modulating the laser diode. This may be achieved by applying a control signal such as a voltage or current to a nonlinear electronic circuit which generates either or both of a second-order distortion signal and a third-order distortion signal of specified amplitude and phase. The transmitted microwave signal itself may be monitored to perform this tuning or the adjustment on the voltage or current. In this case, the laser diode operating point is fixed resulting in certain second and third order distortion properties that can be minimized by proper choice of the electronic circuit parameters. The optical domain signal 412 with already reduced nonlinearity is then transmitted through the external optical component in the optical linearizer 420 for further reduction in the nonlinear distortions. The transmission operating point of the external optical component can be aligned with the operating point of the laser diode to generate a compensating second- and/or third-order signal with desired amplitude and phase. This allows for further reduction in the nonlinear transmission characteristics to be achieved. A typical scenario would be a third-order electronic pre-distortion circuit is used to minimize the CTB and a second-order optical linearizer used to minimize the CSO. In practice, the laser diode operating current and temperature or the operating point associated with the linearizing optical component might be adjusted to achieve optimal optical linearization. In open loop operation, the transmitted microwave signal can be used to make the appropriate adjustments. Once optimal optical linearization has been achieved, the electrical circuit parameters of the pre-distortion circuit might need slight readjustment to account for minor laser diode operating point dependent distortion.

When the optical linearization is carried out first in an open loop system, the transmission operating point of the external optical component in the optical linearizer 420 may be aligned with the operating point of the laser diode in the transmitter 410 to reduce the nonlinear transmission characteristics. This operation may be achieved with the electronic pre-distortion circuit 430 turned off and using the same laser diode and optical component parameter adjustments mentioned above. The electrical pre-distortion circuit can then be turned on and tuned to further reduce either or both of the second and the third order nonlinearities introduced by the laser diode. Understanding that the optical linearization process is in general, a more broadband linearization approach, there are advantages to performing optical linearization adjustments first. However, this is not required in each hybrid linearization system. In general, the combination and implementation of these two linearization approaches are compatible and highly independent.

This hybrid or dual electrical and optical linearization approach for improving the linearization of optically transmitted microwave signals may be used in such a way that the electrical linearization might improve either second- or third-order nonlinear distortion only, while the optical linearization optimized to improve the other distortion component. In another configuration under this approach, both the electrical and optical linearization process may be used to improve both the second- and third-order optical transmitter nonlinearity. Flexibility exists with this approach in allowing both the electrical and optical domain linearization to be tailored and optimized independently and on a case by case basis. This process is valuable in allowing for inferior laser diodes with respect to linearity to be substantially improved. The linearity improvements that can be obtained with this hybrid technique generally exceed the improvements of each of these techniques used separately. One virtue of this hybrid technique is that the optical linearization can be done not only at the transmitter site, but at the optical detector site as well. This allows for the possibility of correcting for any fiber induced nonlinearities incurred during the long fiber transmission. In this special case as well as for some other topologies, active control to maintain minimum distortion levels might be desired.

An open loop implementation of the hybrid linearization system may not be sufficient in certain application where the distortions may vary over time. Hence, a closed loop operation control of the dual linearization might be desirable to correct such variations in the distortions in real time. The active control and minimization of the nonlinear distortion using this combination approach can be achieved in a variety of ways. For example, either or both the electrical and optical domain linearization can be operated and controlled in a closed loop control.

Figure 5:
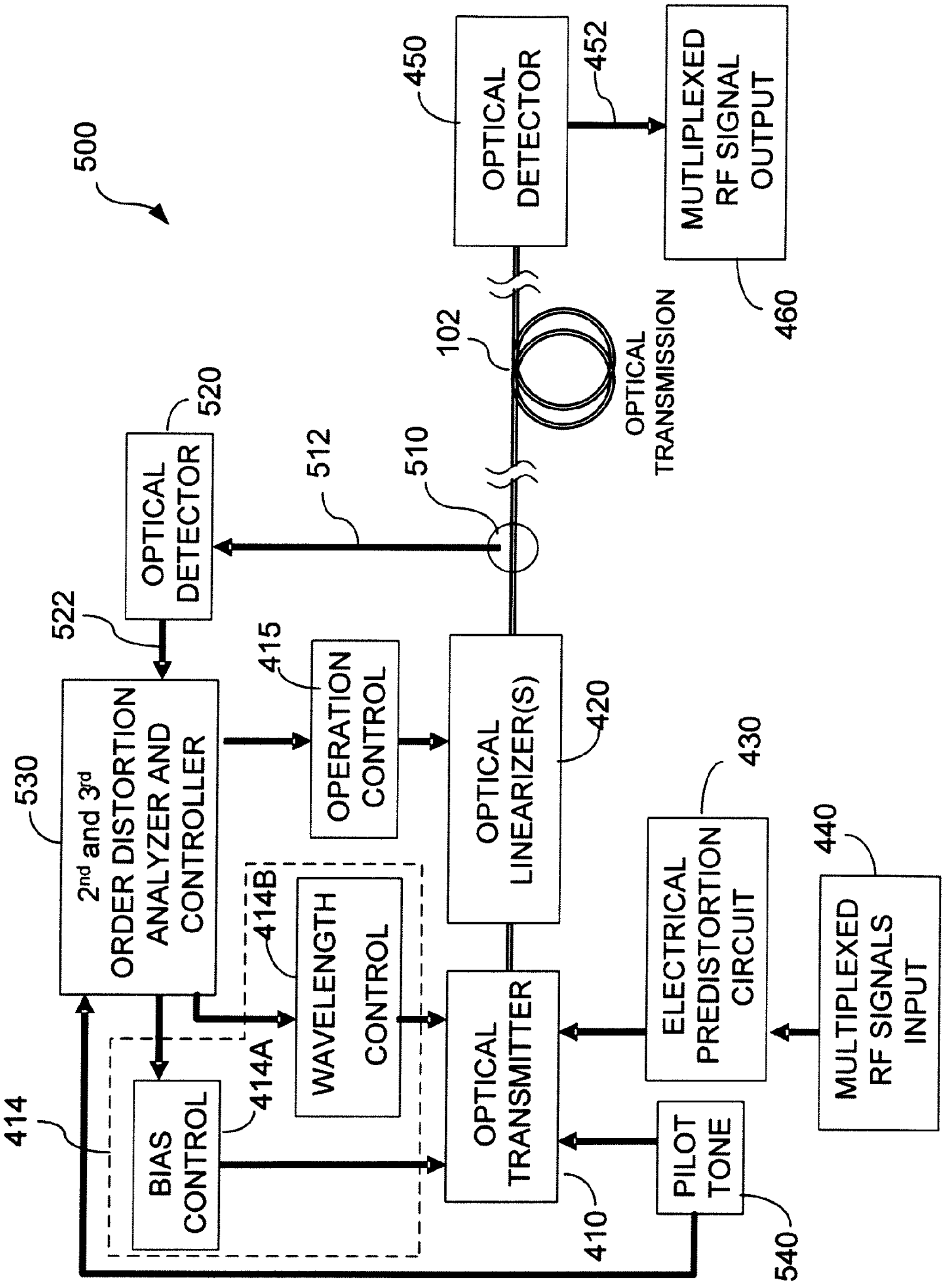
FIGS. 5 through 13 illustrate various implementations of the hybrid electrical and optical linearization mechanism in optical communication systems.

FIG. 5 shows an optical communication system 500 based on the hybrid linearization design, where the optical domain linearization is actively controlled by a feedback loop. A small portion 212 of the optical signal 412 after the optical processing by the optical linearizer 420 is tapped off by an optical beam splitter or coupler 510 and is detected by an optical detector 520 for the feedback loop. The electrical signal 522 generated by the detector 520 is fed into a distortion analyzer and controller 530. The analyzer 530 detects distortion levels of the injected pilot tone from a pilot tone generator 340 and provides feedback to actively maintain minimum distortion levels. Although a dedicated pilot tone is shown for simplicity, in many cases the microwave signal to be transmitted can be used to analyze the nonlinear distortion levels and determine the feedback signal so that a pilot tone is not needed. As illustrated, the laser control 414 includes a bias control 414A and a wavelength control 414B in this implementation. The laser wavelength, e.g., through a temperature control on the laser diode, and the bias point of the optical transmitter 410, are controlled through this active feedback process to minimize or negate the transmitter distortion. In addition, the operating point of the linearizing optical component in the optical linearizer 420 is shown to be actively controlled by the analyzer 530 to provide fine adjustment to the optical linearizer 420.

Figure 6:
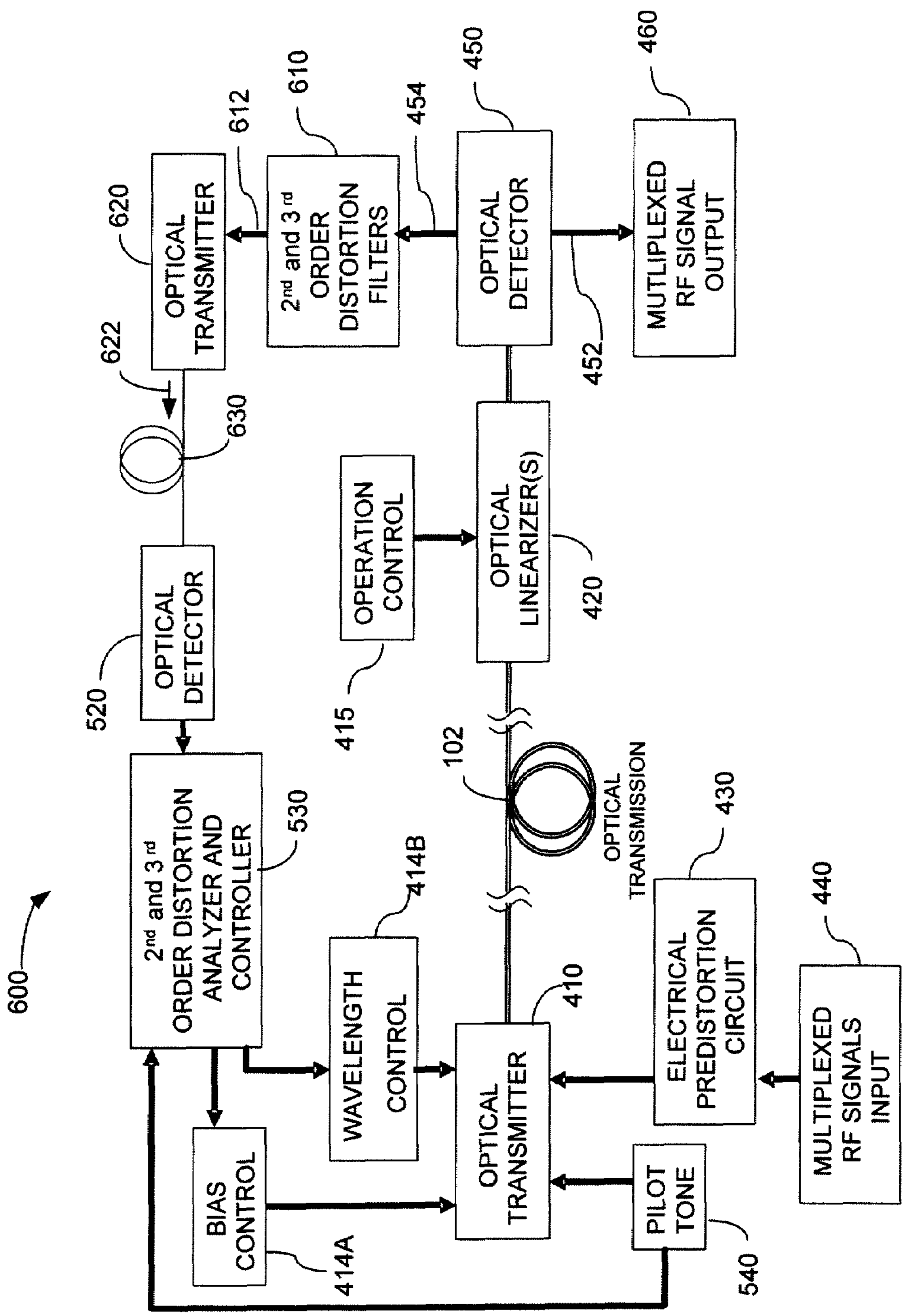

FIG. 6 shows an optical communication system 600 where the optical linearizer is co-located with the optical detector 450 at the signal receiving end and the control feedback is provided through an optical link 630 back to the optical transmitter 410 on the signal transmitting side. The optical detector 450 processes the received signal to extract the multiplexed RF signals 460 as output and generate another output signal 454. One or more distortion filters 610 are used to receive and process the output signal 454 to produce an electronic signal 612 containing information on the signal distortions in the received signal by the optical detector 450. A feedback optical transmitter 620, which may include a laser diode, produces a feedback laser signal 622 that is modulated to include the distortion information in response to a laser control signal based on the signal 612. After transmitting through the fiber feedback loop 622, the feedback laser signal 622 is received by the optical detector 520. The distortion analyzer 530 receives the output from the detector 520 and causes the optical transmitter 410 to be controlled to reduce the distortions received by the optical detector 450. Here, the laser diode in the optical transmitter 410 may be principally adjusted through bias current and the diode temperature to achieve distortion suppression.

Figure 7:
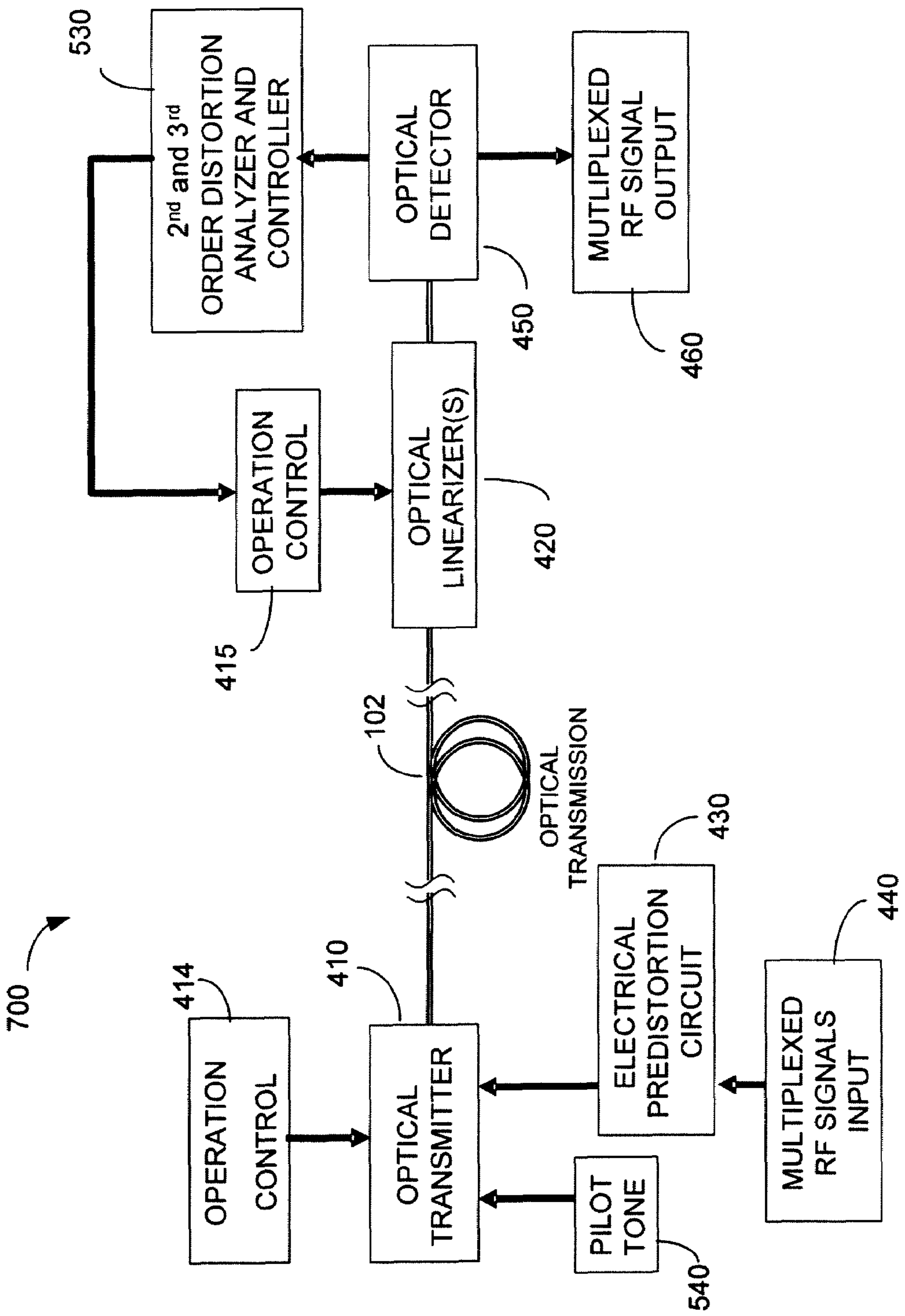

FIG. 7 shows another embodiment 700 where the optical linearizer 420 is co-located with the optical detector 450 on the receiving end, where the feedback control is principally provided to the optical linearizer 420 where its operating parameters are altered to minimize the link distortion. In this case, the laser diode operating conditions are fixed and distortion suppression is principally achieved through feedback control to the optical component in the optical linearizer 420.

Figure 8:
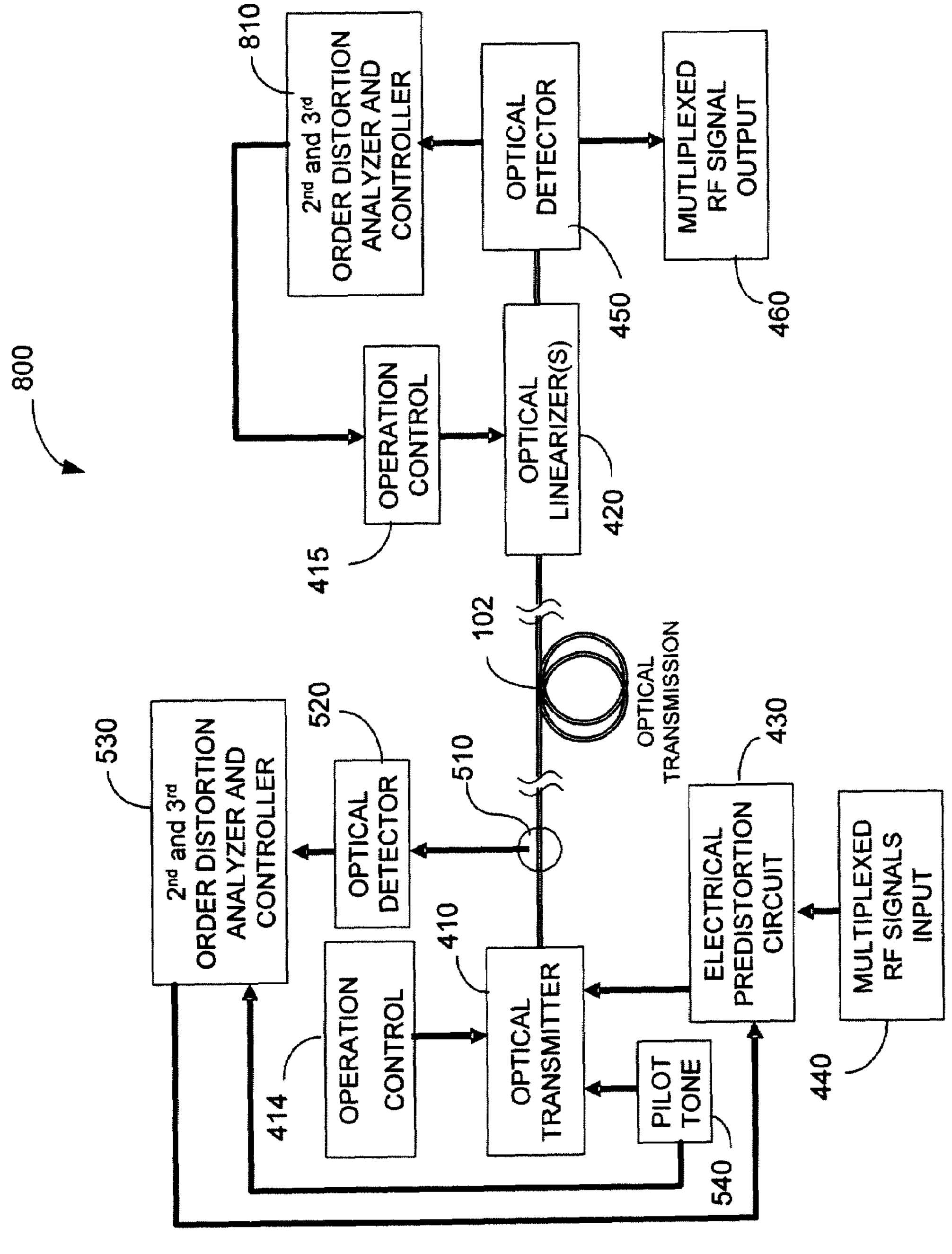

In addition to the above exemplary system implementations, the active feedback from a distortion analyzer e.g., the 2nd and 3rd order distortion analyzer and controller, may be applied to each of the electrical pre-distortion circuit 430 and the optical linearizer 420 to maintain minimum transmission distortion conditions. FIG. 8 shows one embodiment of a system 800 where two separate feedback loops are applied to control the electrical pre-distortion circuit 430 and the optical linearizer 420. In the illustrated example, the optical linearizer 420 is located on the receiving end with the optical detector 450. Hence, a separate distortion analyzer and controller 810 is coupled to the optical detector 450 to provide a feedback control to the control 415 of the optical linearizer 420. For the electronic pre-distortion circuit 430, the distortion analyzer and controller 530 is shown to control the operation of electronic pre-distortion circuit 430 based on the signal distortions in the signal prior to transmission through the link 102. The optical tap for monitoring the harmonic content of the applied pilot tone can be placed before the optical linearizer. In this case, the feedback signal reflects only electrical domain linearization characteristics. A separate feedback path can be applied after the optical linearizer to optimize the optical domain linearization process. Hence, the active feedback is used for both the electrical and optical domain linearization.

In the above dual electrical and optical link linearization approach, the independence of the two linearization mechanisms is shown as examples and flexibility in its implementation and should allow for higher performance microwave optical transmission systems to be realized. The above hybrid linearization techniques may also be used in systems where an optical modulator is used to modulate the beam to imprint information on the modulated beam. Here, the pre-distortion circuit is used to control the modulator and the optical linearizer is in the optical path of the modulated beam.

FIGS. 9-13 show additional exemplary implementations and embodiments of hybrid linearization systems that combine both electrical pre-distortion linearization and optical linearization.

A number of additional modes of operation or permutations of the hybrid link linearizer are possible. In one operation mode, for example, the electrical pre-distortion circuit may be used to partially correct either one or both of the second- and third-order laser induced distortions; accordingly, the optical linearizer may be used to improve upon this partial correction. Alternatively, the electrical pre-distorter may be used to fully correct the second- (third-) order laser distortion while the optical linearizer is complimentary used to fully correct for the third- (second-) order distortion.

Examples of these two cases are experimentally demonstrated below. One fiber optic link, for example, may include an electrical pre-distorter to correct for the laser diode induced third-order distortion while the optical linearizer is independently used to correct for the laser induced second-order distortion. As another example, the fiber optic link may include an electrical pre-distorter which partially corrects for the laser second-order laser distortion and the optical linearizer can operate to improve upon this partial distortion suppression.

Figure 9:
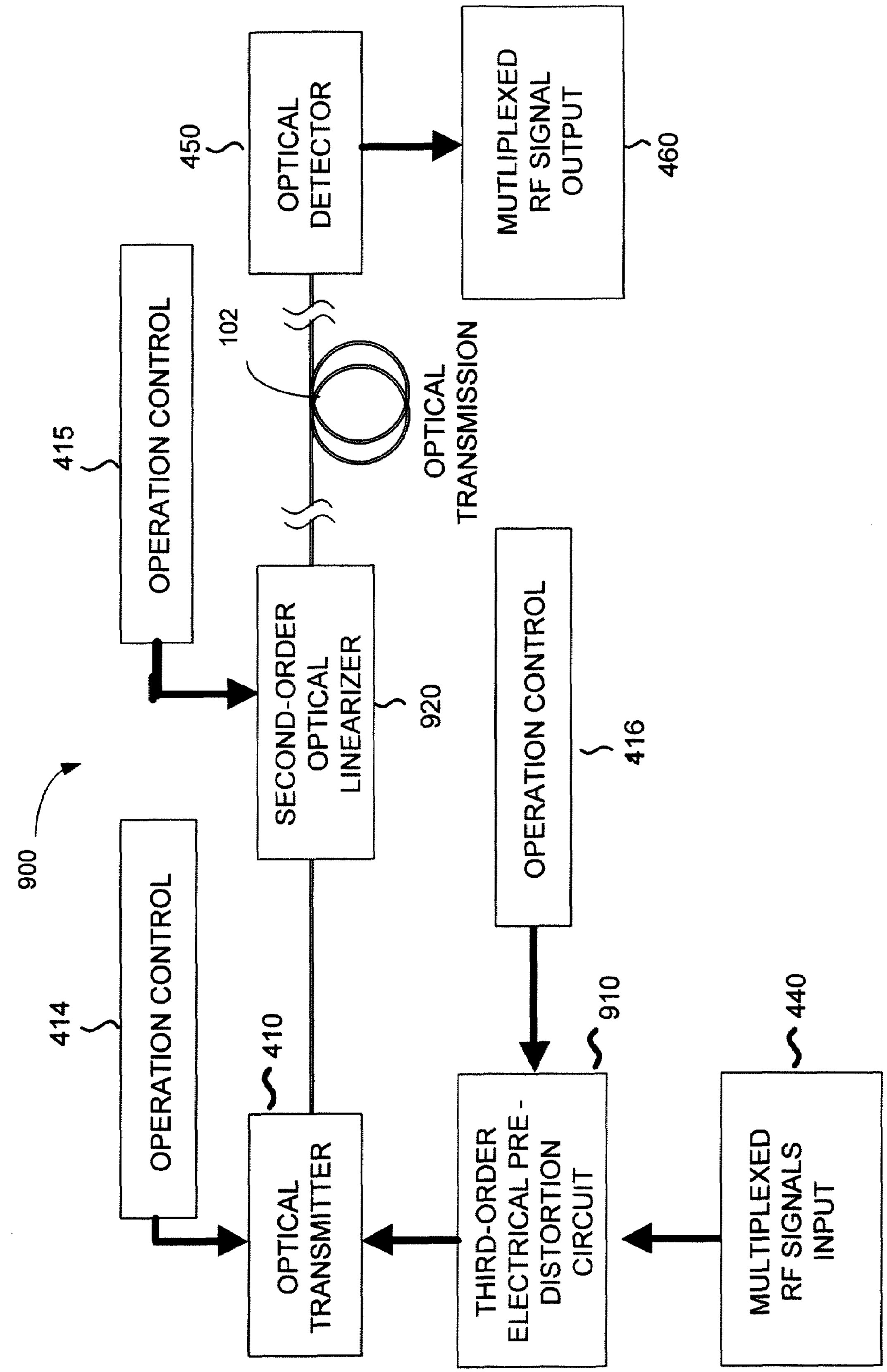

FIG. 9 shows a hybrid system 900 with electrical compensation for third-order laser distortion by using a pre-distortion circuit 910 and optical compensation for second-order laser distortion by using a second-order optical linearizer 920. This arrangement is a more specific arrangement as that shown in FIG. 4. Any suitable third-order electrical pre-distorter may be used in this embodiment, such as a circuit similar to that described by Huang and Saad in "Novel Third-Order Distortion Generator with Residual IM2 Suppression Capabilities," IEEE Transactions on Microwave Theory and Techniques, Vol. 46 (12), pp. 2372-2382 (December, 1998). The second-order optical linearizer 920 may include a wavelength dependent fused fiber coupler that has been tailored for operation around 1310 nm, similar to that described by C. K. Sun in "Optical Linearizer for Fiber Communications," U.S. patent application Ser. No. 09/825,631, filed Apr. 3, 2001.

For this measurement, a CATV grade starting laser diode at 1310 nm may be used as the optical transmitter 110 which is biased at high DC current and RF modulated by a composite 78 channel NTSC CATV signal. The modulated optical signal was transmitted through 20 km of standard single-mode fiber, detected by a high linearity optical receiver, and analyzed using a CATV signal analyzer. The Carrier-to-Noise Ratio (CNR), the Composite Second Order (CSO) and Composite Triple Beat (CTB) distortion are measured yielding the link linearity performance. For reference, performance levels are measured with 0 dBm received optical power.

Table 1 shows the link performance with no electrical or optical linearization, displaying poor CSO and CTB performance (CSO and CTB values lower than −65 dBc at high CNR (>52 dB) are typically required for CATV signal distribution applications).

Table 2 shows the link performance with combined electrical third-order compensation and optical second order compensation. Simple open loop control and adjustment of the electrical pre-distortion circuit, the optical linearizer and the optical transmitter have been used for this measurement. The details of open and closed loop operation for distortion minimization are discussed below. Significant improvement in the laser distortion properties are obtained using this hybrid linearization approach, approximately 10 dB third-order improvement and >20 dB second-order improvement, displaying the utility of this combined approach.

TABLE 1

Measured fiber optic link performance for NTSC 78 channel CATV loading with 0 dBm received power with no electrical or optical linearization

| Freq (MHz) | CNR (dB) | CSO (dBc) | CTB (dBc) |
|---|---|---|---|
| 55.25 | 54.6 | −45.6 | −58.5 |
| 343.25 | 53.5 | −48.5 | −59.0 |
| 547.25 | 54.1 | −47.2 | −60.5 |

TABLE 2

Measured fiber optic link performance for NTSC 78 channel CATV loading with 0 dBm received power with electrical third-order laser distortion compensation and optical second-order laser distortion compensation

| Freq (MHz) | CNR (dB) | CSO (dBc) | CTB (dBc) |
|---|---|---|---|
| 55.25 | 54.7 | −73.7 | −73.4 |
| 343.25 | 53.5 | −70.7 | −70.9 |
| 547.25 | 53.4 | −68.7 | −69.9 |

Figure 10:
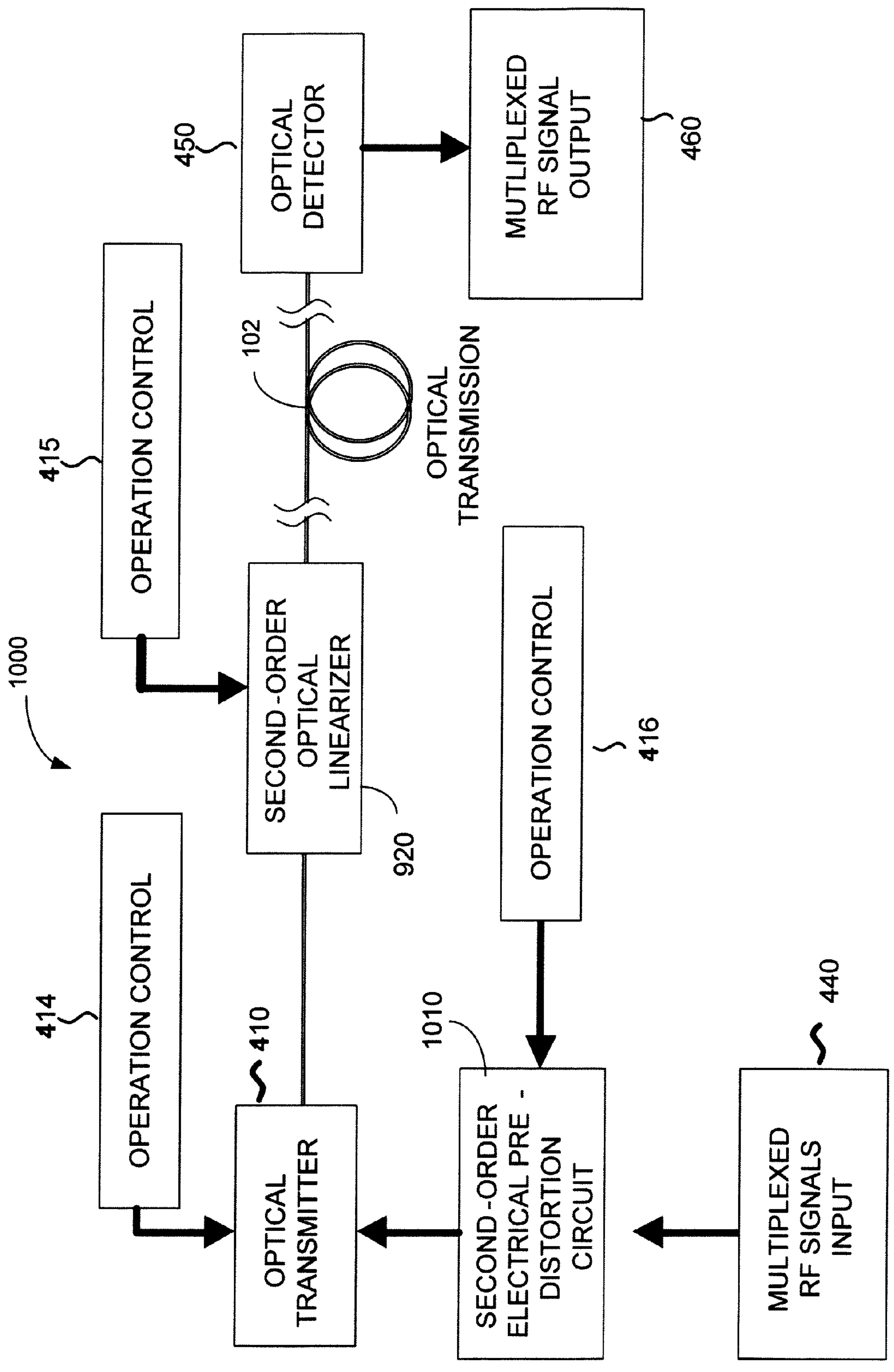
Figure 11:
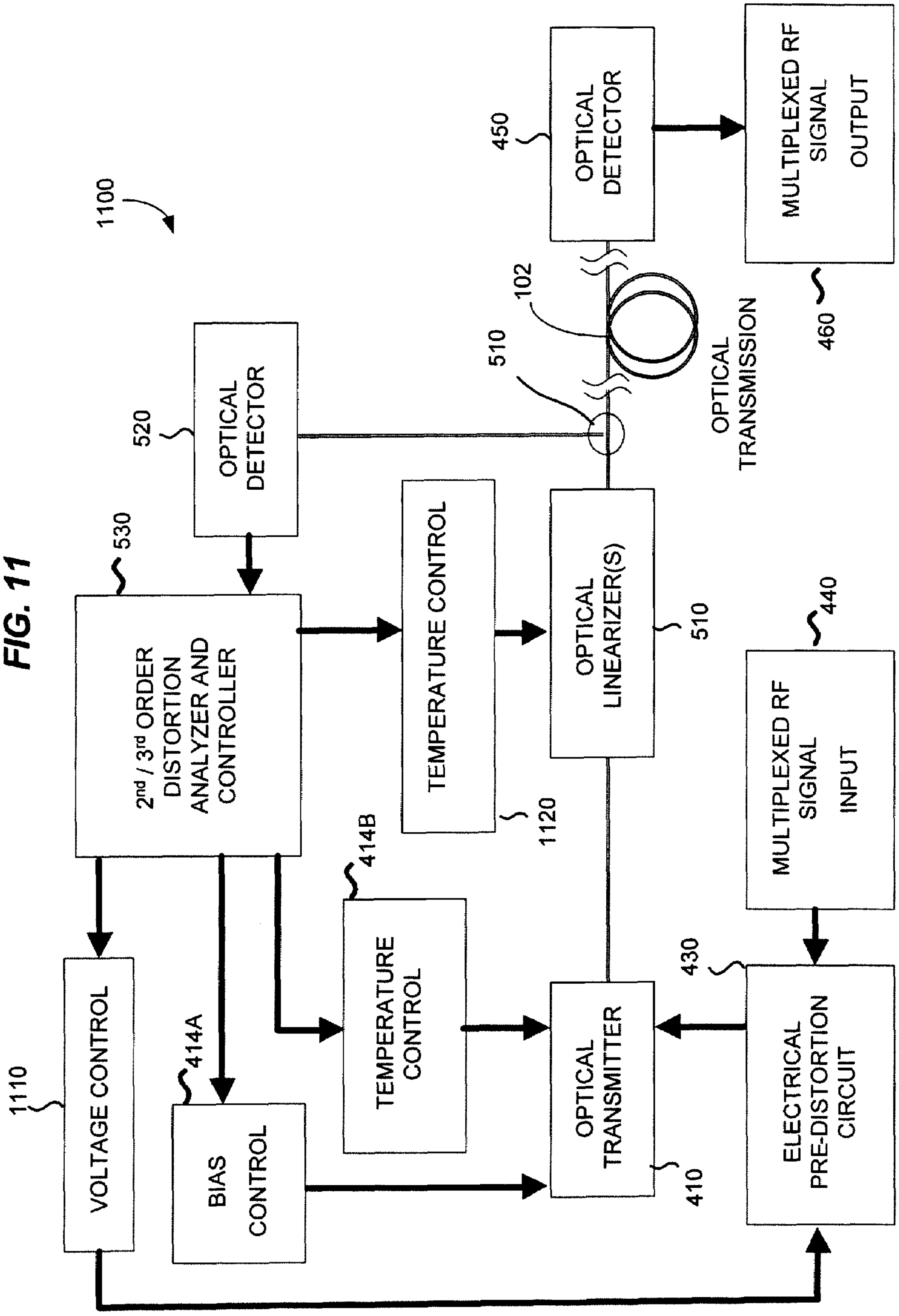

FIG. 10 shows the link arrangement 1000 for electrically and optically compensating for second-order laser distortion. A second-order electrical pre-distortion circuit 1010 is used for the optical transmitter 410. For simplicity, complimentary third-order correction is not shown. This arrangement is useful for cases where either optical or electrical compensation alone is not sufficient, and combined operation results in improved linearity. Most of the same fiber optic link and linearizer components and conditions as that described above have been used. The major difference is that an electrical second-order pre-distortion circuit 1010 has been employed. This system 1000 has an open loop linearization scheme which includes the electrical pre-distortion circuit 1010, the optical linearizer 920, and the optical transmitter 510.

TABLE 3

Measured fiber optic link performance for NTSC 78 channel CATV loading with 0 dBm received power with no linearization, electrical linearization, optical linearization and combined optical-electrical second-order link linearization

| Freq (MHz) | CNR (dB) | CSO (dBc) | No electrical and optical linearization |
|---|---|---|---|
| 55.25 | 52.37 | −46.3 | CSO in −47 dB range |
| 343.25 | 52.0 | −51.2 | (−65 dB required) |
| 547.25 | 51.4 | −48.7 | |
| **Freq (MHz)** | **CNR (dB)** | **CSO (dBc)** | **Electrical linearization** |
| 55.25 | 53.0 | −63.6 | 8 dB worse case CSO |
| 343.25 | 52.0 | −59.0 | improvement |
| 547.25 | 51.6 | −66.5 | |
| **Freq (MHz)** | **CNR (dB)** | **CSO (dBc)** | **Optical linearization** |
| 55.25 | 53.1 | −68.6 | 15 dB worse case CSO |
| 343.25 | 52.7 | −66.6 | improvement |
| 547.25 | 52.2 | −64.2 | |
| **Freq (MHz)** | **CNR (dB)** | **CSO (dBc)** | **Electrical & optical second order linearization** |
| 55.25 | 53.5 | −66.8 | 18 dB worse case CSO |
| 343.25 | 52.7 | −69.8 | improvement |
| 547.25 | 51.9 | −69.6 | |

Table 3 shows the CNR and CSO link performance with no electrical or optical linearization displaying poor second-order distortion performance. Also included in Table 3 is the link performance with electrical, optical and combined electrical/optical second-order compensation. Significant improvement (>3 dB) in the link linearity performance is obtained using this combined hybrid linearization approach, displaying its utility overcoming transmitter distortion related limitations.

The two demonstration examples discussed above can be implemented using either open or closed loop operation. FIG.

11 shows a system embodiment where the electrical and optical domain linearization are actively controlled. A small portion of the optical signal is tapped off at the optical coupler 510 within or after the optical linearizer 120 and is detected by the detector 520. The resulting electrical signal is fed into a distortion analyzer and controller 530. The analyzer 530, in this and other implementations, may include a microcontroller in its simplest form, to a more complex microcontroller with integrated RF filter and power meter. The analyzer 530 either directly or indirectly detects distortion levels by monitoring the optical power or electrical RF power level of the injected composite RF signal 440 providing feedback to actively maintain minimum distortion levels. In some cases, it might be advantageous to inject an RF pilot tone in addition to the multiplexed RF signal 440 to be used to analyze the nonlinear distortion levels and determine the feedback signal. The laser wavelength, through temperature control 414B for the laser diode, for example, and the bias point of the optical transmitter 410, through temperature control 1120 for the linearizer 420, for example, can be controlled through this active feedback process to minimize the transmitter distortions. In addition, the operating point of the electrical predistortion circuit 430 can be actively controlled through its voltage or current controller 810 which is coupled between the devices 530 and 430. Using this approach, active monitoring can be applied to either or both optical domain linearization or electrical domain linearization. In practice, closed loop operation for the optical linearization and open loop operation for the electrical linearization is preferred.

Figure 12:
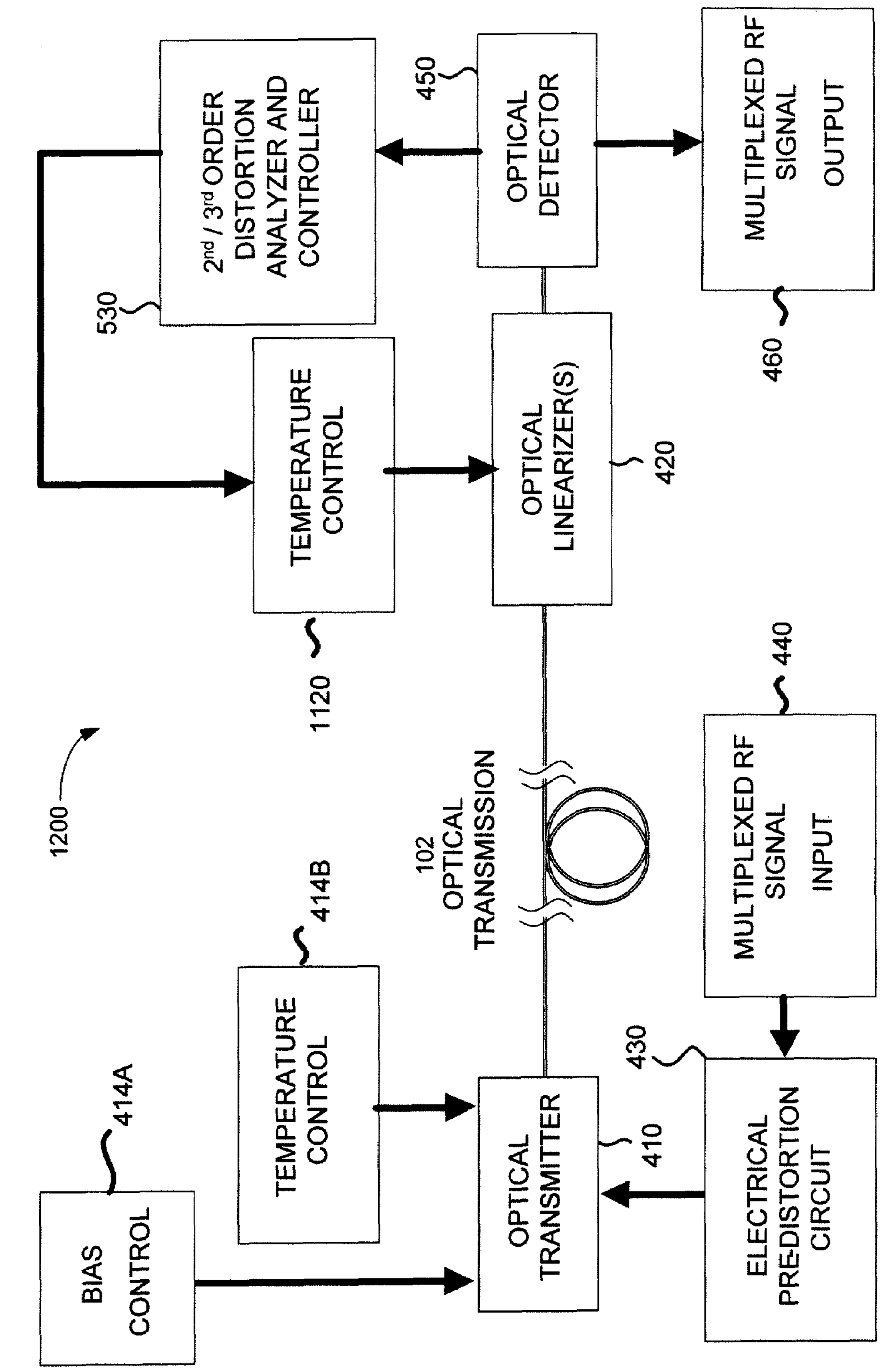

FIG. 12 shows an embodiment 1200 where the optical linearizer 120 is co-located with the optical detector 450. This is a variation of the embodiment shown in FIG. 7. In this embodiment, the feedback is provided through the distortion analyzer 530 and temperature controller 820 to the optical linearizer 420 where its operating parameters are altered to minimize the link distortion. The operating conditions of the laser diode in the transmitter 410 and the electronic predistortion circuit 430 are fixed (open loop operation) and distortion suppression is principally achieved through feedback control (closed loop operation) to the optical linearizer 420.

Figure 13:
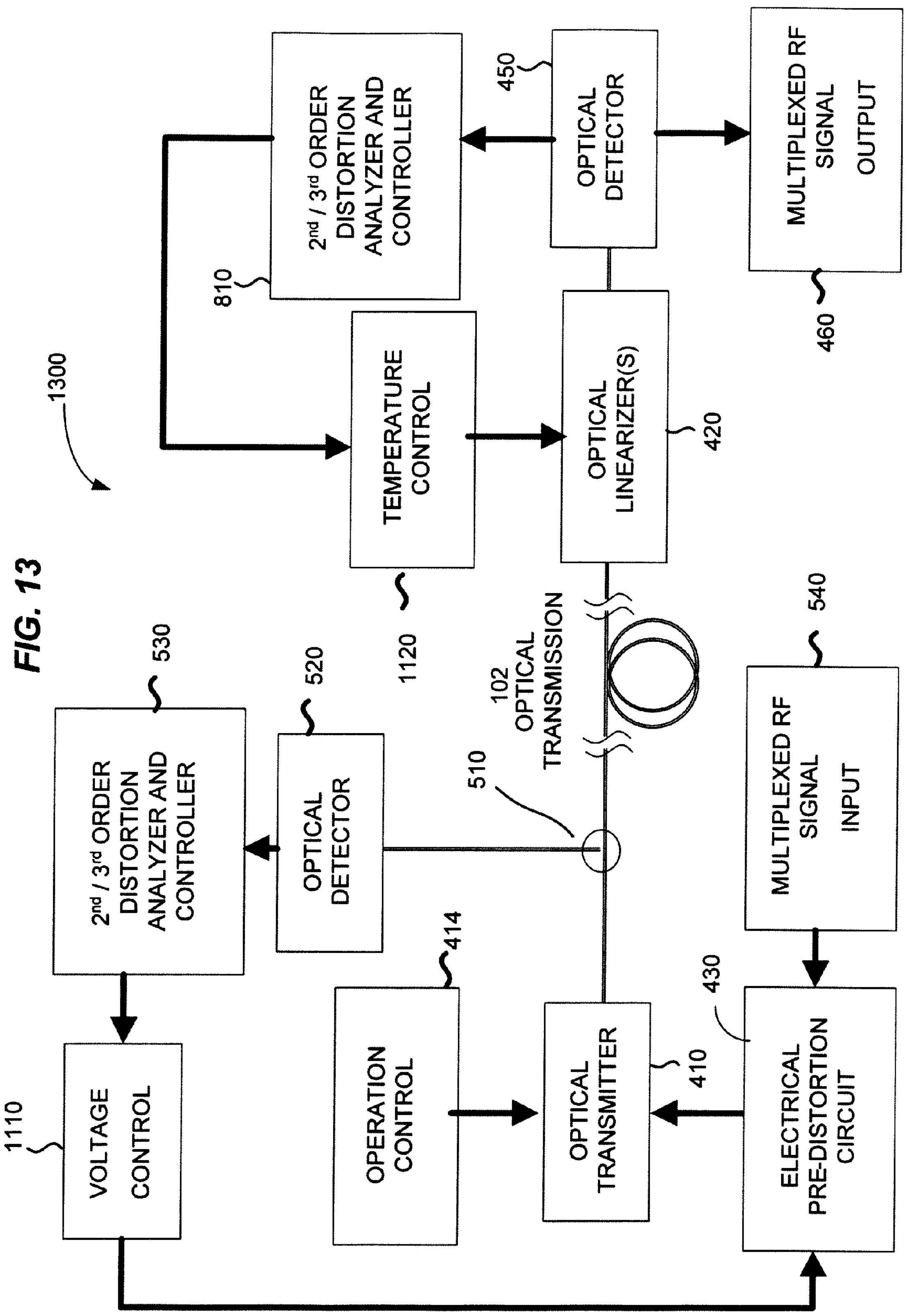

FIG. 13 further shows that a system 1300 alternative to the embodiment shown in FIG. 8, where closed-loop active feedback mechanisms for both electrical and optical linearization can be achieved by placing the optical linearizer 420 at the remote optical detector 450. The electrical feedback control loop for the pre-distortion circuit 130 does not use the pilot tone generator as in FIG. 8. The control 1120 for the optical linearizer 420 is a temperature control device to change the temperature of the optical element inside of the linearizer 420. In this case, the front-end feedback signal reflects only transmitter linearization characteristics while the receiver based analyzer and controller 430 reflects overall link distortion properties.

The optical linearizer 420 used in the above-described systems may be implemented in various configuration. In accordance with the present invention, a communications apparatus for linearizing the output of an optical transmitter (such as a DFB laser diode), includes an optical device (such as a fused fiber WDM coupler). Specifically, the optical device is connected to receive the output of the optical transmitter. It happens that the output from the optical transmitter will include a modulated signal, as well as second and third order distortions (hereinafter sometimes collectively referred to as a "transmitter distortion"). Importantly, the transmitter output also includes a characteristic wavelength "chirping". In accordance with the present invention, this "chirping," together with the desired transmitter output, is used as an input by the optical device, to optically generate nonlinear distortion signals (hereinafter sometimes collectively referred to as "compensation distortions") that will compensate the transmitter distortion. Accordingly, the compensation distortions can be added to the output of the optical transmitter to cancel the transmitter distortions (second and/or third order distortions) in the output.

Technically, the modulated signal that is transmitted by the transmitter (e.g. laser diode) will have a center emission wavelength ($\lambda_c$) and a characteristic wavelength chirping ($d\lambda_c$). Further, the optical device (e.g. coupler) will include components for establishing a predetermined, wavelength dependent, normalized optical transfer curve $F(\lambda)$. Specifically, this optical transfer curve $F(\lambda)$ is fabricated to accommodate the operating condition of the optical transmitter. In particular, the optical transfer curve $F(\lambda)$ of the optical device is designed to have a reference wavelength ($\lambda_p$), a slope determinant wavelength spacing ($\Delta\lambda_w$), and an operating point wavelength offset ($\Delta\lambda_b$) that are all based on the known operating conditions of the transmitter.

In their connection with each other, the optical device and the optical transmitter can be individually or collectively wavelength (e.g. temperature) tuned. Preferably, an operating temperature for the optical transmitter (or optical device) can be established which will align ($\lambda_c$) of the transmitter with ($\lambda_p+\Delta\lambda_b$) of the optical device. Regardless how the operating temperature is established, when the system is tuned, an operating point can be established on the optical transfer curve $F(\lambda)$ that will interact with the wavelength chirping ($d\lambda_c$) from the transmitter in a specified manner. Preferably, this operating point is established on the optical transfer curve $F(\lambda)$ where $\lambda_p+\Delta\lambda_b=\lambda_c$. Thus, the purpose here is to use $F(\lambda)$ to optically induce a compensation distortion from the wavelength chirping ($d\lambda_c$) that will substantially compensate the transmitter distortions (second and/or third order distortions) that are introduced by the transmitter. Once the compensation distortions have been induced by the optical device (e.g. coupler), linearization of the optical transmitter (e.g. laser diode) is accomplished by adding the compensation distortion to the output of the transmitter. Stated differently, the compensation distortion is added to the output of the optical transmitter to cancel the transmitter distortion from the modulated signal in the output.

Figure 14:
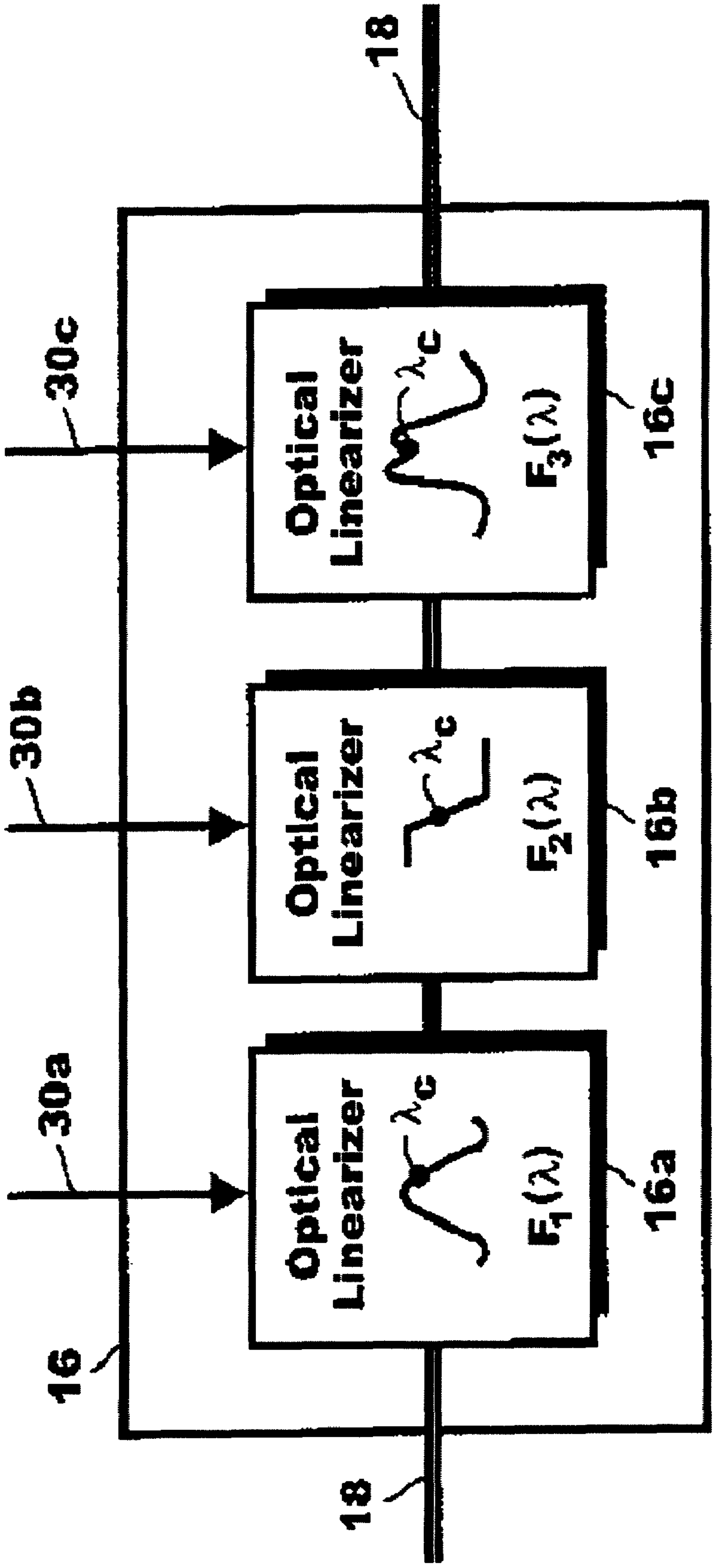
FIG. 14 illustrates various exemplary optical transfer curves $F(\lambda)$ that can be incorporated in an optical linearizer in accordance with the present invention.

FIG. 14 shows that an optical linearizer 16 may include two or more optical linearizing elements in series with different optical transmission characteristics. Referring back to FIG. 4, communications data is generated by a signal source 440 and is used to modulate the optical transmitter 410. The communications data from signal source 440 may be in a digital, an analog, or a mixed format. The modulated signal of the output of optical transmitter 410 is then fed into the optical linearizer 420. For purposes of the present invention, the optical transmitter 410 may include a laser diode such as a DFB laser diode. It is to be appreciated, however, that the optical transmitter 410 may be a direct modulated laser diode, an electro-absorption modulator, or a Mach-Zehnder modulator. Importantly, the output of the optical transmitter 410 at $\lambda_c$ may have an analog modulation format that is sinusoidal in nature. It is also important to recognize that, in all cases, the output of the optical transmitter 410 will include more than just the modulated signal to be transmitted. Specifically, in addition to the modulated signal, the output of optical transmitter 410 generally includes optical distortions (second and/or third order) and it can have a "chirping" ($d\lambda_c$) that is characteristic of the optical transmitter 110. Referring to FIG. 5, the laser control 414 may include a bias control 414A which can be used to influence the content of the output from the optical transmitter 410 (e.g. minimizing the third-order distortions). The laser control 414 may also include a wavelength control 414B to establish or tune the center emission wavelength ($\lambda_c$). The wavelength control 114B can be tuned in several ways, such as by temperature tuning, voltage tuning, current tuning or mechanical tuning.

The optical linearizer 420 may be a fused fiber WDM coupler, or, alternatively, be any optical device with a wavelength dependent transfer function. Such a device may include wavelength dependent absorptive (or gain) materials, electro-absorption semiconductor waveguides, fiber Bragg-gratings, wavelength dependent coupling interleavers, Mach-Zehnder waveguide modulators, acoustic-optical tunable filters, tapered fiber filters, thin film filters or arrayed waveguide grating (AWG) filters. These types of devices may be used either individually or in combination with each other to form the linearizer 420. The optical linearizer 420 may be designed and fabricated to have a specific optical transfer curve F(λ). Because the optical linearizer 420 is a wavelength dependent device, it can be tuned by the operation control 415.

FIG. 14 also shows various types of exemplary optical transfer curves that can be fabricated for the optical linearizer 420. Specifically, the optical linearizers 16*a*, 16*b* and 16*c* are shown with respective optical transfer curves $F_1(\lambda)$, $F_2(\lambda)$ and $F_3(\lambda)$ that may be controlled (tuned) by respective operation controls 30*a*, 30*b* and 30*c*. It is to be appreciated that the optical linearizers 16*a*, 16*b* and 16*c* are only exemplary, and that they may be used either individually or collectively depending on the specific requirements of the application. Further, these linearizers 16*a*, 16*b* and 16*c* may all operate substantially in the same way. The functionality of the linearizers 16*a*, 16*b* and 16*c*, and their interaction with the optical transmitter 12 will, perhaps, be best appreciated with reference to FIG. 15.

Figure 15:
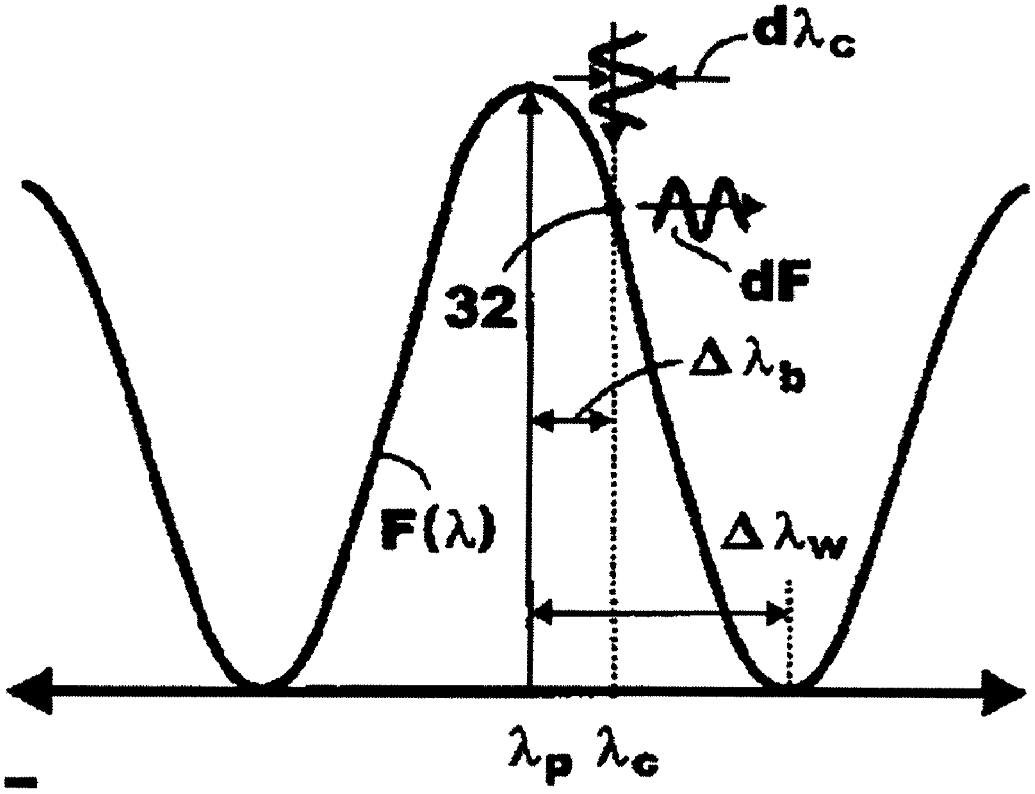
FIG. 15 is an optical transfer curve $F(\lambda)$ showing a chirped wavelength input ($\delta\lambda_c$) interacting with the optical transfer curve $F(\lambda)$ to create modulations ($\delta F$) to induce compensation distortions that are useful for linearizing the output of an optical transmitter.

FIG. 15 shows an optical transfer curve F(λ) that is typical of one that can be fabricated for a fused fiber WDM coupler type optical linearizer 420. The optical transfer curve F(λ) is characterized by a reference wavelength ($\lambda_p$) and a slope determinant wavelength spacing ($\Delta\lambda_w$). Also, FIG. 12 shows a typical operating point 32 for the optical linearizer 120 that is identified by the wavelength offset $\Delta\lambda_b$. The slope of the transfer curve changes as the operating point 32 is changed. This, of course, need not always be so (e.g. linearizer 16*b* in FIG. 14). Nevertheless, for the optical transfer curve F(λ) shown in FIG. 15, both the reference wavelength ($\lambda_p$), and a slope determinant wavelength spacing ($\Delta\lambda_w$), can be fabricated for the optical transfer curve F(λ). The coupler operating point offset ($\Delta\lambda_b$) can then be established (tuned) on optical transfer curve F(λ) by the operation controller 30. Preferably, this is done by temperature tuning.

Figure 16A:
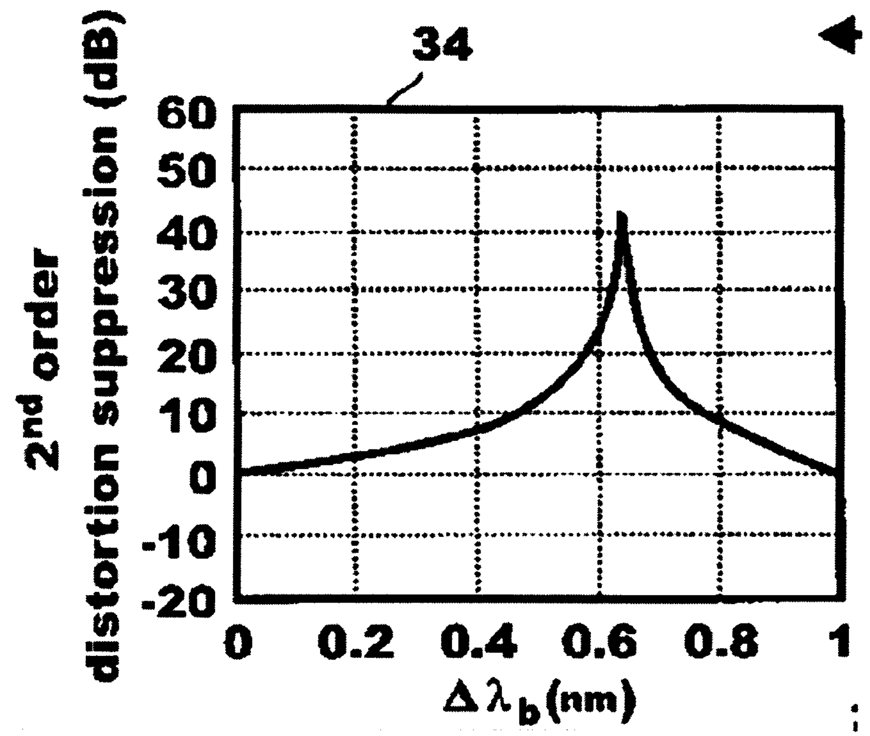
FIG. 16A is a graph showing empirical results for suppression of second order distortions as a function of the operating point wavelength of an optical linearizer.
Figure 16B:
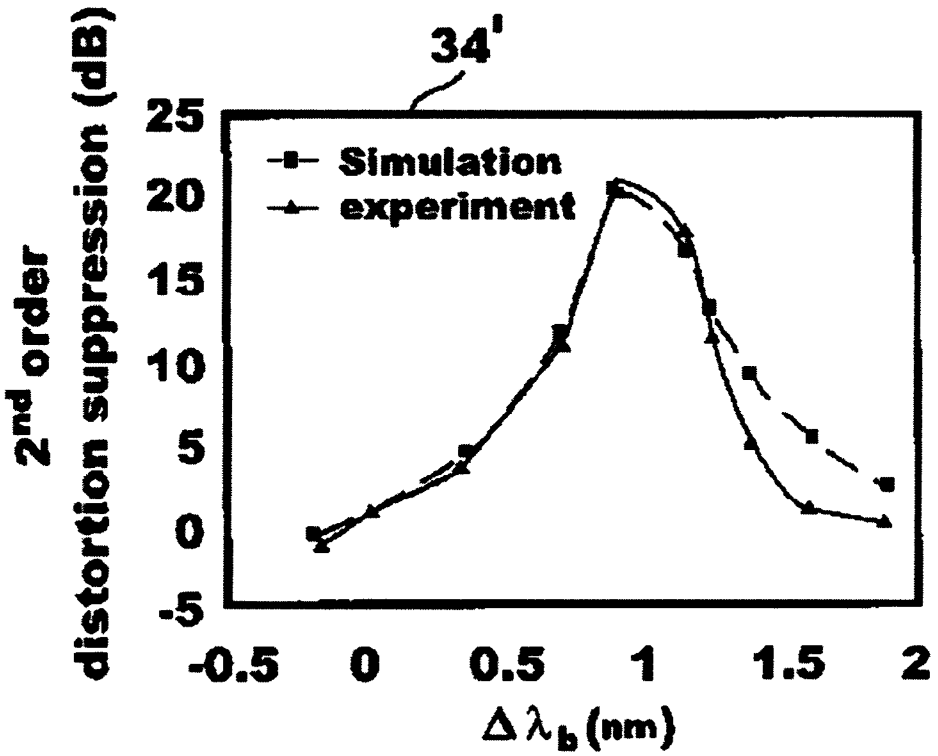
FIG. 16B is a graph showing a comparison between simulation results and experimental data for a specific operating condition of the present invention.
Figure 17:
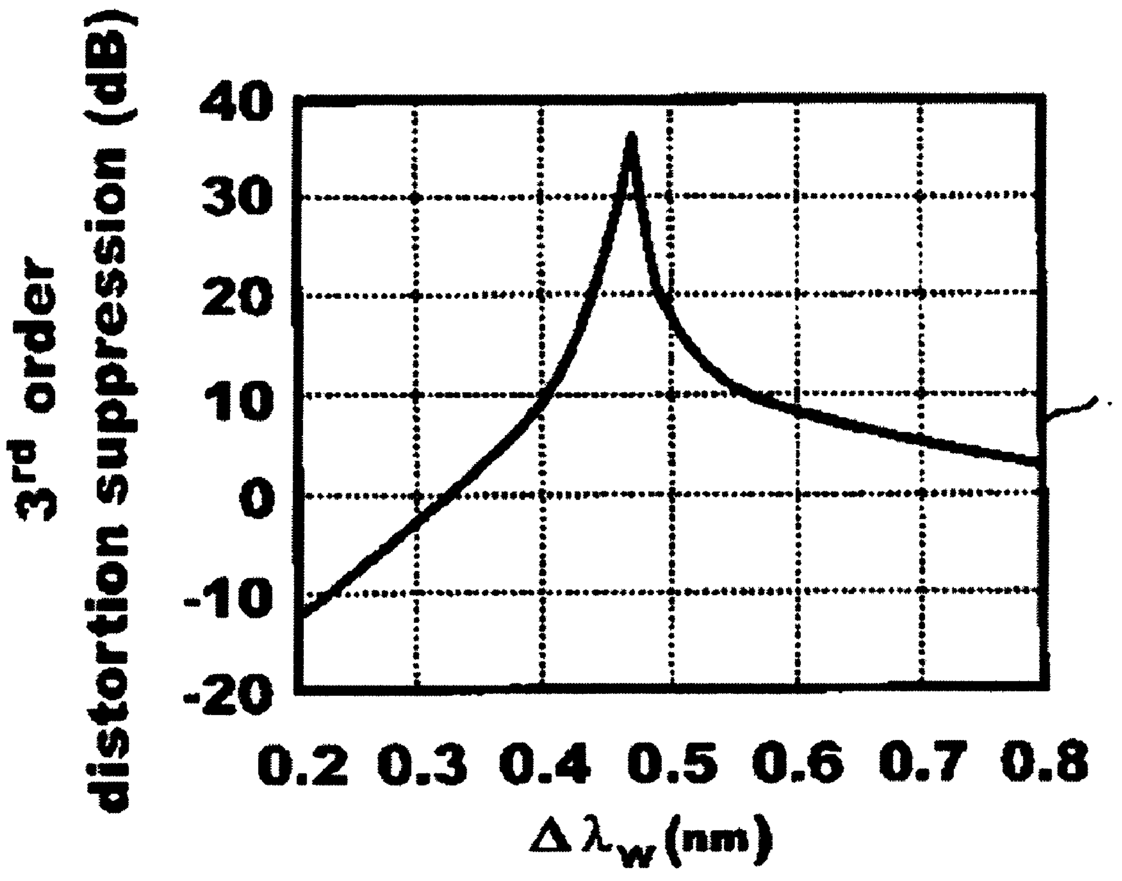
FIG. 17 is a graph showing empirical results for suppression of third order distortions as a function of a slope determinant wavelength spacing of an optical linearizer.

Still referring to FIG. 15, it will be appreciated that the operating point 32 should be established where $\lambda_c=\lambda_p+\Delta\lambda_b$. Accordingly, when the wavelength chirped $d\lambda_c$ from the optical transmitter 12 is fed into the optical linearizer 16, the interaction of the wavelength chirped $d\lambda_c$ at the operating point 32 of the optical transfer curve F(λ) results in an output having modulations (dF). FIGS. 16A and 17 respectively show graphs 34, 36 that present empirical data for the suppression of optical distortions in a system 10. Further, FIG. 16B shows a comparison 34' between an empirical simulation and experimental data obtained for a suppression of optical distortions similar to those shown for the graph 34 of FIG. 16A. Specifically, these graphs 34, 36 indicate there is an identifiable operating point wavelength offset ($\Delta\lambda_b$), and an identifiable slope determinant wavelength spacing ($\Delta\lambda_w$) for each optical linearizer 410 that can induce a modulation (dF) which effectively suppresses transmitter distortions (second and/or third order).

Generally, the wavelength dependency of an optical linearizer 16 can be represented by a normalized optical transfer curve F(λ). Mathematically, this transfer curve F(λ) can be expressed in Taylor series around the center emission wavelength $\lambda_c$ of the transmitter:

$$F(\lambda) = F_0(\lambda_c) + F_1(\lambda-\lambda_c) + F_2(\lambda-\lambda_c)^2/2 + F_3(\lambda-\lambda_c)^3/6 + \ldots + F_n(\lambda_c)(\lambda-\lambda_c)^n/n! + \ldots \quad \text{(Eq. 1)}$$

where $F_n=d^nF(\lambda)/d\lambda^n$ with $\lambda=\lambda_c$. Further, the modulated wavelength λ(t) (i.e. modulated signal output) of the optical transmitter 410 can be expressed as $\lambda(t)=\lambda_c+d\lambda_c(t)$. For the present invention, in response to the transfer curve F(λ), the transmitter chirping dλc creates a modulated linearizer output (dF). Thus, the output of the optical linearizer 420 can be expressed as:

$$P_{out}(t,\lambda)=P_{TR}(t)\cdot\alpha\cdot F(\lambda) \quad \text{(Eq. 2)}$$

where $P_{out}$ is the output of the optical linearizer 120, $P_{TR}$ is the output of the transmitter, and α is the optical insertion loss of the optical linearizer 420.

In the specific case where the optical transmitter 110 is a DFB laser diode, the transmitter chirping $d\lambda_c$ under single tone modulation can be expressed as:

$$d\lambda_c(t)=-\eta_{FM}\cdot m\cdot(I_b-I_{th})\cdot\sin(\omega\cdot t)\cdot\lambda_c^2/C \quad \text{(Eq. 3)}$$

where C is the light speed, $\eta_{FM}$ is the FM response of the laser, $I_b$ is the laser bias current, $I_{th}$ is the laser threshold current, m is the optical modulation depth, and ω is the modulation angular frequency. Combining Equations (1) to (3), we can obtain the modulated linearizer output from P(λ) due to laser chirping as:

$$P_{out}(t,\lambda) = P_{TR}(t)\cdot\alpha\cdot\{F_0(\lambda_c) + F_1\cdot(\lambda_m\cdot\sin(\omega\cdot t)) + F_2\cdot(\lambda_m\cdot\sin(\omega\cdot t))^2/2 + F_3\cdot(\lambda_m\cdot\sin(\omega\cdot t))^3/6 + \ldots\} \quad \text{(Eq. 4)}$$

where $\lambda_m=-\eta_{FM}\cdot i_b\cdot(\lambda_c)^2/C$ and $i_b=m\cdot(I_b-I_{th})$.

When the optical transmitter is a laser diode the output $P_{TR}$ can be modeled from the laser diode's nonlinear L-I curve, using a Taylor expansion as:

$$P_{TR}(I) = P_{LD}(I_b) + h1\cdot(I-I_b) + h2\cdot(I-I_b)^2/2! + h3\cdot(I-I_b)^3/3! + \ldots \quad \text{(Eq. 5)}$$

where $hn=(d^nP_{LD}(I)/dI^n)$ at $I=I_b$, and I is the laser diode driving current. Let $I=I_b+m\cdot(I_b-I_{th})\cdot\sin(\omega\cdot t)$ and $i_b=m\cdot(I_b-I_{th})$, then the modulated laser diode output is $$P_{TR}(t) = P_{LD}(I_b) + h1\cdot(i_b\cdot\sin(\omega\cdot t)) + h2\cdot(i_b\cdot\sin(\omega\cdot t))^2/2 + h3\cdot(i_b\cdot\sin(\omega\cdot t))^3/6 + \ldots\,. \quad \text{(Eq. 6)}$$

Combining Equations (4) and (6), we can derive the second- and third-order compensation distortion contents after the output of the optical linearizer 110 as:

$$P_{out,2nd} \approx \alpha \cdot i_b^2 \cdot \cos(2\cdot\omega\cdot t)\cdot\{-h2\cdot[F_0(\lambda_c)+F_2\cdot(\eta_{FM}\cdot\lambda_c^2/C)^2\cdot i_b^2/2]/4 + h1\cdot F_1\cdot(\eta_{FM}\cdot\lambda_c^2/C)/2 + h1\cdot F_3\cdot(\eta_{FM}\cdot\lambda_c^2/C)^3\cdot i_b^2/12 + h3\cdot F_1\cdot(\eta_{FM}\cdot\lambda_c^2/C)\cdot i_b^2/12 + 5\cdot h3\cdot F_3\cdot(\eta_{FM}\cdot\lambda_c^2/C)^3\cdot i_b^4/192 - P_{LD}(I_b)\cdot F_2\cdot(\eta_{FM}\cdot\lambda_c^2/C)^2/4\} \quad \text{(Eq. 7)}$$

and $$P_{out,3rd} \approx \alpha \cdot i_b^3 \cdot \sin(3\cdot\omega\cdot t)\cdot\{-h3/24\cdot[F_0(\lambda_c)+F_2\cdot(\eta_{FM}\cdot\lambda_c^2/C)^2\cdot i_b^2/4] + h2/8\cdot[F_1\cdot(\eta_{FM}\cdot\lambda_c^2/C)+F_3\cdot(\eta_{FM}\cdot\lambda_c^2/C)^3\cdot i_b^2/8] - [h1+h3\cdot i_b^2/8]\cdot F_2\cdot(\eta_{FM}\cdot\lambda_c^2/C)^2/8 + [P_{LD}(I_b)+h2\cdot i_b^2/4]\cdot F_3\cdot(\eta_{FM}\cdot\lambda_c^2/C)^3/24\}. \quad \text{(Eq. 8)}$$

The second-order distortion terms in Equation (6) primarily consist of a combination of the second-order distortion $P_{out,2nd,LD}$ originated from the laser diode transmitter, second-order distortion $P_{out,2nd,LD}\otimes_{linearizer}$ due to the mixing of the first order laser output with the first-order chirping-modulated linearizer output, and the second-order chirping-modulated linearizer output $P_{out,2nd,linearizer}$. According to Equation (7) with proper $\lambda_c$ and optical linearizer function $F(\lambda)$, the second-order distortion $P_{out,2nd,LD}$ can be suppressed or compensated primarily by $P_{out,2nd,LD}\otimes_{linearizer}$ and $P_{out,2nd,linearizer}$. Similarly, the third-order distortion can be suppressed by proper $\lambda_c$ and $F(\lambda)$.

The generality of this approach can be demonstrated using a few illustrative examples. For an optical linearizer with linear wavelength attenuation relationship, such as the linearizer 16*b* shown in FIG. 14, i.e., $F_{n\geqq 2}=0$, the second-order distortion can be suppressed if $F_1=h2\cdot F_0(\lambda_c)\cdot C/(2\cdot h1\cdot\eta_{FM}\cdot\lambda_c^2)$ and the third-order distortion can be suppressed if $F_1=h3\cdot F_0(\lambda_c)\cdot C/(3\cdot h2\cdot\eta_{FM}\cdot\lambda_c^2)$ where $F_1$ is the slope of the normalized transfer curve at $\lambda_c$. For an optical linearizer using fused fiber WDM coupler with an optical transfer curve $F(\lambda)$ as shown in FIG. 15, this transfer function $F(\lambda)$ can be expressed as:

$$F(\lambda)=[1+\cos(\pi\cdot(\Delta\lambda_b+d\lambda)/\Delta\lambda_w)]/2 \quad \text{(Eq. 9)}$$

where $\alpha\lambda_w$ is the fused fiber WDM coupler slope determinant wavelength spacing (i.e. the WDM coupler channel spacing), $d\lambda_c$ is the wavelength chirping of the optical transmitter 12, and $\Delta\lambda_b$ is the coupler operating point offset. According to FIG. 15, we have $\Delta\lambda_b=\lambda_c-\lambda_p$ where $\lambda_p$ is the reference wavelength of the coupler. Using Equations (3), (7), (8) and (9), the second- and third-order distortions can be approximated as:

$$P_{out,2nd} \approx \alpha\cdot i_b^2\cdot\cos(2\cdot\omega\cdot t)\cdot\{-h2\cdot[1+\cos(\pi\cdot\Delta\lambda_b/\Delta\lambda_w)]/8 - h1\cdot\sin(\pi\cdot\Delta\lambda_b/\Delta\lambda_w)\cdot(\pi/2)\cdot(\lambda_c^2/C)\cdot(\eta_{FM}/\Delta\lambda_w)/2 + P_{LD}(I_b)\cdot\cos(\pi\cdot\Delta\lambda_b/\Delta\lambda_w)\cdot[\pi\cdot(\lambda_c^2/C)\cdot\eta_{FM}/\Delta\lambda_w]^2/8\} \quad \text{(Eq. 10)}$$

-continued $$P_{out,3rd} \approx \alpha\cdot i_b^3\cdot\sin(3\cdot\omega\cdot t)/2\cdot\{-h3/24\cdot[1+\cos(\pi\cdot\Delta\lambda_b/\Delta\lambda_w)] - h2/4\cdot\sin(\pi\cdot\Delta\lambda_b/\Delta\lambda_w)\cdot(\pi/2)\cdot(\lambda_c^2/C)\cdot(\eta_{FM}/\Delta\lambda_w) + h1\cdot\cos(\pi\cdot\Delta\lambda_b/\Delta\lambda_w)\cdot[\pi\cdot(\lambda_c^2/C)\cdot\eta_{FM}/\Delta\lambda_w]^2/8 + P_{LD}(I_b)\cdot\sin(\pi\cdot\Delta\lambda_b/\Delta\lambda_w)\cdot[\pi\cdot(\lambda_c^2/C)\cdot\eta_{FM}/\Delta\lambda_w]^3/24\}. \quad \text{(Eq. 11)}$$

In light of the above, compensation distortion suppressions with a fused fiber WDM coupler can be examined using laser diode parameters where $h1\approx 0.36$ mW/mA, $h2\approx 1.5\cdot 10^{-4}$ mW/mA$^2$, and $h3\approx 4\cdot 10^{-6}$ mW/mA$^3$. Assuming $I_b-I_{th}=60$ mA, m=13%, $\lambda_c=1310$ nm, $\eta_{FM}=100$ MHz/mA, optical losses of 4.6 dB, laser output power of 22 mW, 0.85 mA/mW detector responsivity, no additional distortions after fiber transmission/detection and no distortion compensation from the optical linearizer 16, the detected fundamental signal is −18 dBm, the second-order harmonic is −79 dBm, and the third-order harmonic is −103 dBm. The above distortions all originate from the optical transmitter 110. With optical linearizer parameters $\Delta\lambda_w=3$ nm and $\Delta\lambda_b=0.65$ nm, the detected fundamental signal is −19 dBm, the second-order harmonics is −120 dBm, and the third-order harmonics is −104 dBm. The second-order distortion is suppressed by 40 dB after optical compensation, with an additional optical loss of 0.5 dB due to coupler offset from the coupler maximum transmission point. With $\Delta\lambda_w=3$ nm, FIGS. 16A and 16B show the second-order suppression as a function of $\Delta\lambda_b$ where a compensation suppression of more than 20 dB can be achieved when $\Delta\lambda_b$ various from 0.6 to 0.7 nm. With optical linearizer 120 having $\Delta\lambda_w=0.47$ nm and no offset ($\Delta\lambda_b=0$ nm), the detected fundamental signal is −18 dBm, the second-order harmonics is −77 dBm, and the third-order harmonics is −140 dBm. The third-order distortion is suppressed by 37 dB after optical compensation. With $\Delta\lambda_b=0$ nm, FIG. 17 shows the third-order suppression as a function of $\Delta\lambda_w$, where a compensation suppression more than 20 dB can be achieved when $\Delta\lambda_w$ varies from 0.45 to 0.49 nm. It is also possible that with a single optical linearizer 120, we can simultaneously suppress both second- and third-order distortions. A simulation with the optical linearizer $\Delta\lambda_w=0.45$ nm and $\Delta\lambda_b=0.02$ nm yields a detected fundamental signal of −18 dBm, the second-order distortions of −107 dBm, and the third-order distortions of −123 dBm. In this case, 20 dB or more suppression is simultaneously obtained for both second- and third-order distortion. To confirm the theory, FIG. 16B shows the second-order distortion suppression obtained by empirical simulation in comparison with experimental data where h1 is about 0.15 mW/mA, $h2=-0.7\times 10^{-4}$ mW/mA$^2$, $\lambda_c=1313$ nm, $\eta_{FM}=270$ MHz/mA, and $\Delta\lambda_w=5.5$ nm.

In the specific case where the optical linearizer 420 is a fused fiber WDM coupler, it can be appreciated with reference to from FIGS. 15, 16A and 16B, that $\lambda_c$ needs to be aligned to $\lambda_p+\Delta\lambda_b$ with certain degree of accuracy to achieve good compensation distortion suppression. Given a specified operation condition for the optical transmitter 410, $\Delta\lambda_w$, and $\Delta\lambda_b$ can be estimated for optimum performance. Knowing $\lambda_c$, a fused fiber WDM coupler can be fabricated with a reference wavelength $\lambda_p=\lambda_c-\Delta\lambda_b$ and the desired slope determinant wavelength spacing $\Delta\lambda_w$. The small offset between $\lambda_c$ and $\lambda_p+\Delta\lambda_b$ can then be minimized by temperature tuning the laser diode (optical transmitter 410) and/or the fused fiber WDM coupler (optical linearizer 420). If the optical linearizer is a fused fiber WDM coupler, the temperature sensitivity of the coupler (optical linearizer 420) may be around 0.01 nm/° C. and the sensitivity of the DFB laser diode (optical transmitter 410) may be around 0.1 nm/° C. The stability of a good laser diode temperature controller can be better than 0.1° C., which corresponds to wavelength stability on the order between 0.01 to 0.001 nm.

The following describes a specific implementation of a fused fiber optical linearizer suitable for the above and other applications. In general, both fused and tapered optical fibers may be used. The fused fiber filter may be fabricated by first stripping the buffer material from two optical fibers over a small distance (typically less than 20 mm). These fibers are cleaned and placed side by side in a clamping mechanism attached to a multi-axis motion control stage. Next, the stripped regions of the two fibers are brought into contact. This may be done either by manually pushing the fibers together or by twisting the fibers around each other. Once the fibers are in place, a heat source, such as a gas flame micro-torch, may be positioned to allow heating of a small section of the fibers to a temperature which will allow them to fuse to each other. This heat source may be allowed to move during fabrication to change the size of the heated region, as well as change in intensity to increase or lower the temperature of the fiber during various stages of the process. Once the heat source is applied, there may be an initial period when the fibers are kept stationary to allow them to fuse a predetermined amount before pulling. The clamps holding the optical fibers may be subsequently set in motion in such a manner as to begin stretching the fibers to form a taper in the heated region. The rate of this tapering may be constant, or it may change to allow precise control over the taper profile. It is typical to pull at a high rate initially to allow for short fabrication times, and then slow near the end of the process to allow better control of the final stopping point.

During the process of creating a fused fiber filter, substantially unpolarized light is input into one of two fibers that are fused together and tapered, and the output power of each fiber is monitored as the coupler is elongated. The injection of either unpolarized light or light that has roughly equal amounts of power polarized in both the principal axes of the fused fibers is beneficial, in that it allows one to view the effects of form birefringence (the polarization effects caused by the non-circular cross-section of the fused region) on the coupling properties. As the fused fibers are pulled and tapered, both the degree of fusion, which affects the coupling coefficient, and the coupling length are gradually increased. It is observed that initially no power is transferred from the input fiber to the other. As the pulling continues light begins to couple over from one fiber into the second fiber. During tapering light initially launched into one of the fibers detaches from the core and becomes guided by the cladding/air interface. Low loss tapers will excite the two lowest order modes of the composite waveguide formed in the tapered region of the two fibers. Since the propagation constants are different for these two modes, there will be a beating of the modes as they propagate down the fused region of the coupler, resulting in a transfer of power from one output fiber to the other, which causes the optical power to cycle sinusoidally between the two output ports if the pulling of the fibers is continued. Due to the fact that different wavelengths of light will have different propagation constants, and thus different coupling rates, at any given stage in the pulling process the power ratio in the two output ports will be different for different wavelengths input to the device. Thus the fused fibers may operate as a wavelength filter, which ends up having a sinusoidal transfer curve as a function of wavelength. This sinusoidal wavelength dependence will have an increasing frequency, and thus a steeper maximum slope, as the device is pulled through longer lengths.

If the coupler is drawn to sufficient lengths, form birefringence in the coupled region results in an additional sinusoidal envelope modulating this power transfer, due to the fact that the coupling coefficients for light aligned along each of the principal axes of the tapered waveguide are slightly different. This effect is only seen when the fibers have been pulled for relatively long lengths, and thus through many power transfer cycles. This envelope is an indication of the polarization dependence of the device. A polarization insensitive fused fiber filter can be created by monitoring the polarization envelope and halting the tapering when the coupling is observed to be at a maximum in the polarization envelope. The required slope of the filter can be determined by selecting which envelope maximum (e.g. first, fifth, tenth, etc.) at which the process is stopped. In addition, the fabrication parameters can be varied to allow for slightly different filter characteristics within a given envelope. After stopping the pulling and removing the heat source, the device may be tuned by slight changes in the tensioning of the fused fibers. This is most reliably accomplished by inserting a broadband light source into the input fiber and connecting one of the output fibers to an optical spectrum analyzer to monitor the wavelength response. The device is then tuned to properly align the peak channel wavelength with the polarization envelope. Proper alignment may include shifting the peak response of the filter to occur at a position different from the polarization envelope maximum in order for the expected operating wavelength (which typically will not be at the filter's peak wavelength) to be aligned as closely as possibly with the polarization envelope maximum, ensuring a high degree of polarization insensitivity.

TABLE 4

| Specifications/Requirements: | |
|---|---|
| Fiber Type | Single mode fiber SMF28 |
| Equivalent Channel Spacing | 4.5-5.0 nm |
| Excess Loss | ≦0.2 dB |
| Wavelength Range | 1305-1315 nm |
| Peak Wavelength Stability | ±0.10 nm (lifetime) |
| Operating Temperature | −20 C.-+65 C. |
| Storage Temperature | −40 C.-+85 C. |
| Operating/Storage Humidity | 5-85% |
| Temperature Response | ≦0.0075 nm/C. (linear) |
| Temperature Slope Variation Between Units | ≦±5% |
| Packaged Size | ⅛" × 2.5" (maximum) |
| Peak Wavelength Isolation * | 27 dB min-30 dB max |
| Polarization Envelope Width | ≧100 nm |

After tuning, the device is then packaged by mounting the filter to a glass substrate (typically using epoxy). Once the coupler has been bonded to the supporting substrate, the substrate is then placed inside a steel tube, and the ends of the tube are sealed. Table 4 shows an example of such a fused fiber linearizer produced with the above fabrication techniques.

Only a few implementations have been described. Modifications and variations of the described implementations may be made without departure from the scope of the following claims.

What is claimed is:

1. A fiber optic transmission system, comprising:

a signal coupler receiving an input modulating signal to generate a first electrical output representative of said input modulating signal and a second complementary electrical output which has a phase shift of 180 degrees with respect to said first electrical output;

two optical transmitters connected to receive said first and said second electrical outputs, respectively, to produce two optical signals which are modulated by said first and said second electrical outputs, respectively;

two optical linearizers respectively located in optical paths of said two optical signals to optically modify said two optical signals, respectively, to reduce signal distortions thereof; and a feedback loop comprising an optical coupler connected to an output of at least one of the two optical linearizers configured to provide an optical monitor signal, an optical detector configured to receive said optical monitor signal to produce a detector output, a distortion control module configured to receive the detector output and to produce a distortion control signal to control at least one of said optical transmitters or one of said optical linearizers to further reduce signal distortions; and a wavelength control unit configured to receive said distortion control signal and control a wavelength of at least one of said optical signals.

2. The system of claim 1, further comprising an optical fiber coupled to the optical linearizers to transmit said two optical signals output by said two optical linearizers to a remote location.

3. The system of claim 2, further comprising two optical detectors coupled to the optical fiber for transforming the optical energy into electrical replicas of the complementary electrical outputs representative of the modulation signal.

4. The system of claim 3, further comprising a signal combiner coupled to the two optical detectors and operable to subtract the electrical replicas representative of the modulation signal to recover modulation in said input modulation signal with a gain.

5. The system of claim 4, wherein the signal combiner comprises a differential input amplifier.

6. The system of claim 4, wherein the signal combiner comprises a wideband hybrid differential coupler.

7. The system of claim 3, wherein said two optical transmitters operate at two different optical wavelengths, and said system further comprising a combining wavelength division multiplexer coupled between said fiber and said two optical linearizers to combine said two optical signals into said fiber.

8. The system of claim 7, further comprising a splitting wavelength division multiplexer between said fiber and said two optical detectors to separate said two optical signals into said two optical detectors, respectively.

9. The system of claim 1, wherein the signal coupler comprises a differential output amplifier.

10. The system of claim 1, wherein the signal coupler comprises a wideband hybrid coupler.

11. The system of claim 1, wherein said optical transmitters comprise laser diodes.

12. The system of claim 1, further comprising a first fiber coupled to one optical linearizer and a second, separate fiber coupled to another optical linearizer to transmit said two optical signals to a remote location.

13. The system of claim 1, further comprising an electrical pre-distortion circuit coupled to each optical transmitter to produce a pre-distortion on each electrical output from said signal coupler prior to reception by said each optical transmitter.

14. The system of claim 13, further comprising a feedback control loop coupled to said electrical pre-distortion circuit to actively adjust said electrical pre-distortion circuit in response to a change in said system.

15. The system of claim 1, wherein one of said optical linearizers includes a fused fiber coupler which produces a wavelength-dependent optical output.

16. The system of claim 1, wherein one of said optical linearizers includes an electro-absorption semiconductor waveguide.

17. The system as in claim 1, wherein one of said optical linearizers includes a fiber Bragg-grating.

18. The system as in claim 1, wherein one of said optical linearizers includes a wavelength dependent coupling interleaver.

19. The system as in claim 1, wherein one of said optical linearizers includes a Mach-Zehnder waveguide modulator.

20. The system as in claim 1, wherein one of said optical linearizers includes an acoustic-optical tunable filter or an arrayed waveguide grating (AWG) filter.

21. A method, comprising:

providing a modulation signal which is modulated with information;

producing a complementary modulation signal which is phase shifted from said modulation signal by 180 degrees;

modulating a first optical transmitter with said modulation signal to produce a first optical signal;

modulating a second optical transmitter with said complementary modulation signal to produce a second optical signal;

transmitting said first and said second optical signals over a fiber link via an optical linearizer to a receiver;

obtaining an optical monitor signal of said fiber link and generating an electrical detector output;

producing a distortion control signal, based on said electrical detector output, to control at least one of said first or second optical transmitters or said optical linearizer;

controlling a wavelength of at least one of said first and second optical signals;

converting said first and said second optical signals at said receiver into two electrical signals; and combining said two electrical signals to effectuate a subtraction to negate distortions caused by fiber dispersion for different frequency components in said first and said second optical signals and to produce an electrical output which includes information in said input modulation signal.

22. The method as in claim 21, further comprising: prior to transmission over the fiber link, optically modifying said first and said second optical signals to reduce signal distortions by using two optical lineanzers.

23. The method as in claim 21, further comprising electrically pre-distorting said modulation signal and said complementary modulation signals before modulating said two optical transmitters.

24. The method as in claim 23, further comprising dynamically adjusting electrical pre-distortions in said modulation signal and said complementary modulation signals in response to a change in distortions.

25. A method for reducing a signal distortion caused by transmission through a fiber transmission system, comprising:

producing an optical signal modulated to carry a signal and a replica of the optical signal with an opposite phase;

transmitting the optical signal and the replica through a common optical path through a fiber transmission system to a receiver;

monitoring the optical signal and feeding back a portion thereof via a distortion analyzer and controller;

controlling a wavelength of said optical signal based on said portion of said optical signal; and subtracting a first signal converted from the optical signal at the receiver and a second signal converted from the replica at the receiver to produce an output signal in which a distortion caused by fiber dispersion in the fiber transmission system is reduced.

26. The method as in claim 25, further comprising:

prior to the transmission, using a first optical linearizer to process the optical signal to reduce a signal distortion caused by a first laser that produces the optical signal; and prior to the transmission, using a second optical linearizer to process the replica of the optical signal to reduce a signal distortion caused by a second laser that produces the replica of the optical signal.

27. The method as in claim 26, further comprising controlling said first and second optical linearizers based on said portion of said optical signal.

* * * * *